US012812419B2

(12) United States Patent
Corgan et al.

(10) Patent No.: US 12,812,419 B2
(45) Date of Patent: Nov. 24, 2026

(54) RADIO FREQUENCY RADIANCE FIELD MODELS FOR COMMUNICATION SYSTEM CONTROL

(71) Applicant: DeepSig Inc., Arlington, VA (US)

(72) Inventors: Johnathan Corgan, San Jose, CA (US); Timothy James O'Shea, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 232 days.

(21) Appl. No.: 18/611,152

(22) Filed: Mar. 20, 2024

(65) Prior Publication Data

US 2024/0323719 A1 Sep. 26, 2024

Related U.S. Application Data

(60) Provisional application No. 63/453,726, filed on Mar. 21, 2023.

(51) Int. Cl.
*H04W 24/06* (2009.01)
*H04W 28/16* (2009.01)

(52) U.S. Cl.
CPC .......... *H04W 24/06* (2013.01); *H04W 28/16* (2013.01)

(58) Field of Classification Search
CPC ..... H04W 24/06; H04W 28/16; H04B 17/391
See application file for complete search history.

(56) References Cited

U.S. PATENT DOCUMENTS

| | | | | |
|---|---|---|---|---|
| 2006/0019679 | A1* | 1/2006 | Rappaport | G01S 5/02521 455/456.1 |
| 2021/0029500 | A1 | 1/2021 | Ye et al. | |
| 2022/0070822 | A1* | 3/2022 | Behboodi | G01S 5/0273 |
| 2022/0312151 | A1* | 9/2022 | Yerramalli | G06N 3/0499 |
| 2023/0342590 | A1 | 10/2023 | O'Shea et al. | |

FOREIGN PATENT DOCUMENTS

WO WO 2023/004560 A1 2/2023

OTHER PUBLICATIONS

Arandjelovic et al., "NeRF in detail: Learning to sample for view synthesis," arXiv:2106.05264v1 [cs.CV], Submitted Jun. 9, 2021, 22 pages.
Mildenhall et al., "NeRF: Representing Scenes as Neural Radiance Fields for View Synthesis," arXiv:2003.08934v2 [cs.CV], Submitted Aug. 3, 2020, 25 pages.
Muller et al., "Instant Neural Graphics Primitives with a Multiresolution Hash Encoding," ACM Trans. Graph., Jul. 2022, vol. 41, No. 4, Article 102, 15 pages.

(Continued)

*Primary Examiner* — Farid Seyedvosoghi
(74) *Attorney, Agent, or Firm* — Fish & Richardson P.C.

(57) ABSTRACT

A method includes executing a radio frequency radiance field (RF-RF) model characterizing an environment; determining, based on outputs of the RF-RF model, one or more characteristics of a wireless channel between a first position and a second position in the environment; and controlling, based on the one or more characteristics of the wireless channel, an RF communication between the first position and the second position. RF-RF models can be used for RF control, communication systems testing and evaluation, system deployment, emitter localization, and other purposes.

22 Claims, 14 Drawing Sheets

800

(56) References Cited

OTHER PUBLICATIONS

PCT International Search Report and Written Opinion in International Appln. No. PCT/US24/20762, dated Jul. 2, 2024, 16 pages.
Pereira et al., "Chapter 2—Plenoptic imaging: Representation and processing," Academic Press Library in Signal Processing, vol. 6, Image and Video Processing and Analysis and Computer Vision, 2018, pp. 75-111 (Abstract only).
Schmitz et al., "Using Spherical Harmonics for Modeling Antenna Patterns," 2012 IEEE Radio and Wireless Symposium, dated added to IEEE Xplore, Apr. 3, 2012, pp. 155-158.
Yu et al., "Plenoxels: Radiance Fields without Neural Networks," arXiv:2112.05131v1 [cs.CV], Submitted Dec. 9, 2021, 21 pages.
Yurkova, Kate, "A Comprehensive Overview of Gaussian Splatting," Dec. 23, 2023, retrived from URL <https://towardsdatascience.com/a-comprehensive-overview-of-gaussian-splatting-e7d570081362>, 19 pages.
Zhang, Qiang, "3D Gaussian Splatting for Real-Time Radiance Field Rendering," Aug. 24, 2023, retrieved from URL <https://zhangtemplar.github.io/3d-gaussian-splatting/>, 17 pages.
Azpilicueta et al., "A Ray Launching-Neural Network Approach for Radio Wave Propagation Analysis in Complex Indoor Environments," IEEE Transactions on Antennas and Propagation, Feb. 26, 2014, 62(5):2777-2786.
Extended European Seach Report in European Appln. No. 24775653.9, mailed on Jun. 17, 2026, 10 pages.

* cited by examiner

700

RADIO FREQUENCY RADIANCE FIELD MODELS FOR COMMUNICATION SYSTEM CONTROL

CROSS-REFERENCE TO RELATED APPLICATION

This application claims the benefit of the filing date of U.S. Provisional Patent Application No. 63/453,726, filed Mar. 21, 2023, the entirety of which is incorporated herein by reference.

TECHNICAL FIELD

The present disclosure generally relates to radio frequency (RF) communication systems.

BACKGROUND

Examples of radio frequency (RF) communication systems include radio access networks (RANs), small communications systems such as small-cell networks and Wi-Fi access point-based networks, cellular networks, and other network types. Channel information can be used to optimize RF communication.

SUMMARY

Implementations of the present disclosure are generally directed to methods, systems, devices, and computer-readable media associated with radio frequency radiance field (RF-RF) models.

Some aspects of this disclosure relate to a method that includes: executing a radio frequency radiance field (RF-RF) model characterizing an environment; determining, based on outputs of the RF-RF model, one or more characteristics of a wireless channel between a first position and a second position in the environment; and controlling, based on the one or more characteristics of the wireless channel, an RF communication between the first position and the second position.

This and other methods described herein can have one or more of at least the following characteristics.

In some implementations, the one or more characteristics of the wireless channel include at least one characteristic that describes time-domain signal propagation over the wireless channel.

In some implementations, the at least one characteristic that describes time-domain signal propagation includes at least one of a power delay profile (PDP) for the wireless channel or an impulse response for the wireless channel.

In some implementations, determining the one or more characteristics of the wireless channel includes tracing a ray in the environment between the first position and the second position, and the outputs of the RF-RF model comprise metric corresponding to characteristics of interaction between RF signals and the environment at positions along the ray.

In some implementations, the characteristics of interaction between the RF signals and the environment at the positions along the ray include: a reflectance, and at least one of an absorption or a transmittance.

In some implementations, the ray includes a first segment and a second segment. The positions along the ray include a reflection point at which the first segment and the second segment meet. Executing the RF-RF model includes providing, as at least one input to the RF-RF model, an angle of the first segment and an angle of the second segment.

In some implementations, determining the one or more characteristics of the wireless channel is based on a time for light to traverse the ray.

In some implementations, the one or more characteristics of the wireless channel include a power delay profile (PDP) for RF transmission between the first position and the second position, and determining the PDP is based on: a power level associated with transmission from the first position to the second position along the ray, the power level determined based on the outputs of the RF-RF model, a time for light to traverse the ray, a plurality of other power levels associated with transmission from the first position to the second position along a plurality of other rays between the first position and the second position, the plurality of other powers determined based on the outputs of the RF-RF model, and times for light to traverse the plurality of other rays.

In some implementations, tracing the ray is performed by: determining a boundary of a region based on RF signal attenuation; selecting a point within the region; and determining the ray as a ray between the first position and the second position and passing through the point.

In some implementations, the RF-RF model includes: a first model trained to output absorptions or transmittances associated with a plurality of positions in the environment; and a second model trained to output reflectances associated with the plurality of positions in the environment.

In some implementations, the RF-RF model includes a first neural network and a second neural network, and executing the RF-RF model includes providing an output of the first neural network as an input to the second neural network.

In some implementations, the RF-RF model includes a learned position embedding module configured to receive, as input, a position in the environment, and to provide, as output, a higher-dimensional embedding of the position. The RF-RF model is configured to use the higher-dimensional embedding as input to another portion of the RF-RF model.

In some implementations, executing the RF-RF model includes providing, as input to the RF-RF model, at least one of a weather condition, a time condition, an identifier of an emitter or receiver, a signal frequency, a signal modulation, or a beam parameter.

In some implementations, controlling the RF communication includes: determining at least one communication parameter based on the one or more characteristics of the wireless channel; and controlling an RF device to transmit an RF signal or receive the RF signal in accordance with the at least one communication parameter.

In some implementations, the at least one communication parameter includes a scheduling of the RF signal, a beamforming parameter to emit the RF signal, a modulation of the RF signal, a frequency of the RF signal, a power level of the RF signal, a spatial mode of the RF signal, or a resource allocation for the RF signal.

In some implementations, determining the at least one communication parameter includes: using the RF-RF model to simulate, using each of a plurality of candidate communication parameters, RF signal propagation between positions corresponding to the RF signal; determining, based on simulating the RF signal propagation, a value of at least one performance indicator for each of the plurality of candidate communication parameters; and selecting the at least one communication parameter based on the values of the at least one performance indicator.

In some implementations, the method includes training the RF-RF model. Training the RF-RF model includes: receiving an RF signal, at a first known position in the environment, from an emitter at a second known position in the environment; determining, based on the received RF signal, one or more characteristics of a second wireless channel between the first known position and the second known position; and training the RF-RF model based on a difference between (i) the determined one or more characteristics of the second wireless channel and (ii) one or more characteristics of the second wireless channel that are estimated by the RF-RF model based on the first known position and the second known position.

In some implementations, training the RF-RF model includes training a set of spherical harmonics that represent at least one of an antenna pattern of the emitter or an antenna pattern of a receiver of the RF signal.

In some implementations, the method includes: storing the RF-RF model on a mobile device; receiving an RF signal at the mobile device; updating, at the mobile device, one or more parameters of the RF-RF model based on the received RF signal; and sending the updated one or more parameters from the mobile device to another device.

In some implementations, the method includes: receiving an RF signal, at a known position in the environment, from an emitter at an emitter position in the environment; determining, based on the received RF signal, one or more characteristics of a second wireless channel between the known position and the emitter position; using the RF-RF model to simulate RF signal propagation between the known position and multiple candidate emitter positions, to determine simulated channel characteristics; and determining the emitter position based on comparisons between the one or more characteristics of the second wireless channel and the simulated channel characteristics.

In some implementations, the RF-RF model includes a Gaussian splatting model that represents the environment as multiple volumetric regions having parametric properties. The multiple volumetric regions are encoded with (i) characteristics of at least one ray output from the multiple volumetric regions, and (ii) a temporal parameter associated with propagation time delay.

Some aspects of this disclosure describe a method that includes: receiving a radio frequency (RF) signal, at a first known position in an environment, from an emitter at a second known position in the environment; determining, based on the received RF signal, one or more characteristics of a wireless channel between the first known position and the second known position; and training a radio-frequency radiance-field (RF-RF) model based on a difference between (i) the determined one or more characteristics of the second wireless channel and (ii) one or more characteristics of the wireless channel that are estimated by the RF-RF model based on the first known position and the second known position.

This and other methods described herein can have one or more of at least the following characteristics.

In some implementations, the method includes: obtaining data characterizing an RF signal received at a base station; and updating, at a wireless network infrastructure device, one or more parameters of the RF-RF model based on the data characterizing the RF signal received at the base station.

In some implementations, the method includes: obtaining data characterizing an RF signal received at a mobile device; and updating one or more parameters of the RF-RF model based on the data characterizing the RF signal received at the mobile device.

The foregoing and other methods can be performed by and/or embodied using at least computing devices, computer systems, and/or non-transitory computer-readable media. A computer system or computing device can include one or more processors, and one or more non-transitory, computer-readable storage media storing instructions that, when executed by the one or more processors, cause the one or more processors to perform operations including the foregoing and other methods described herein.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
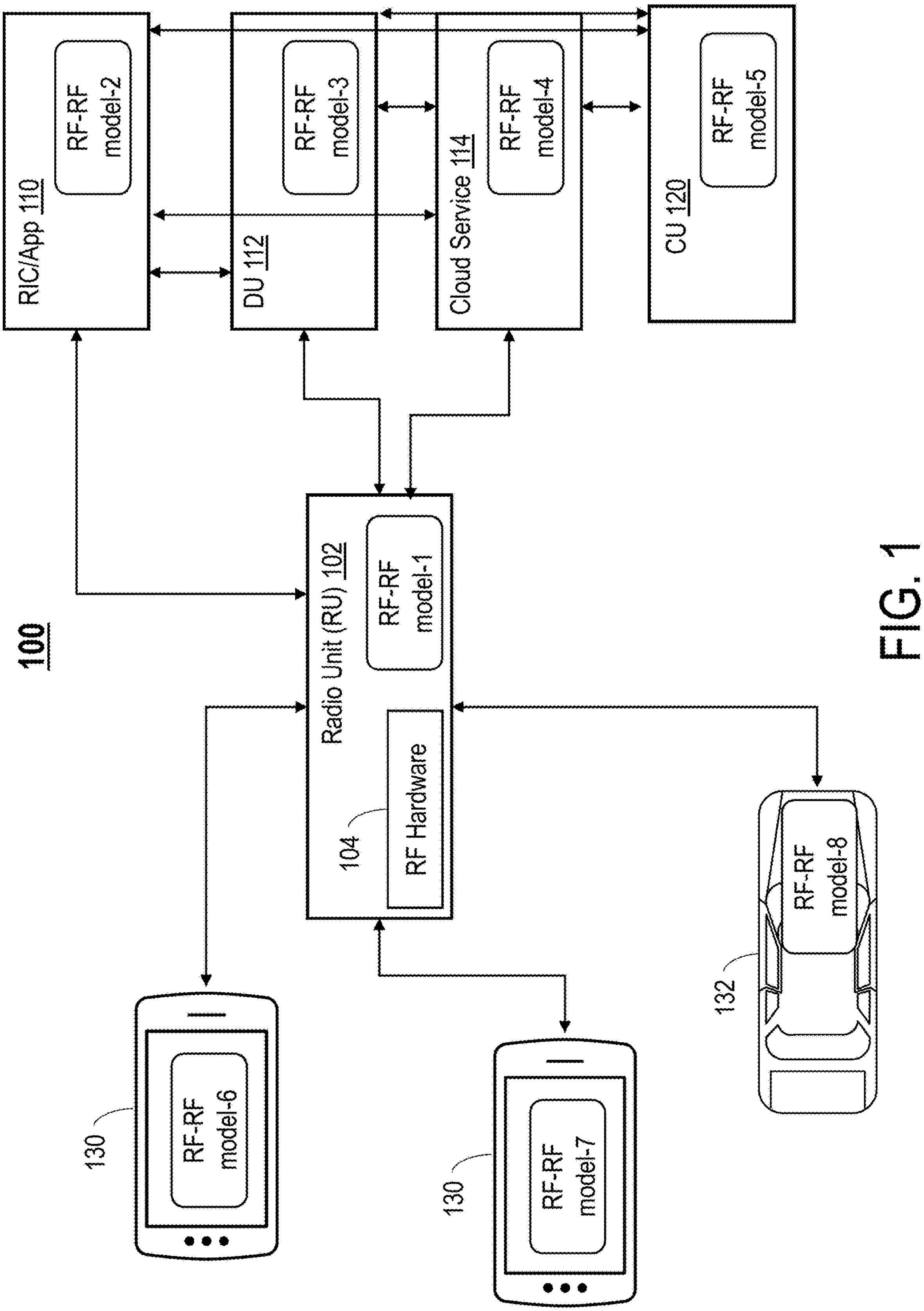
FIG. 1 is a diagram illustrating an example of a radio frequency (RF) system.

Various aspects of this disclosure describe the training, technical details, and use of radio frequency radiance field (RF-RF) models for RF signal transmission and reception control, RF communication simulations, RF network deployment, and other purposes. These models encode RF signal propagation characteristics of an environment for efficient calculation of wireless channel characteristics in the environment. Using trained RF-RF models, various network devices, such as user equipment (UE), cellular phones, vehicles, base stations, and/or back-end network systems can optimize their RF control to provide improved and more-efficient communication.

In general, wireless propagation and channel modeling are critical tools for the development and optimization of wireless systems. By predicting the characteristics of propagation of wireless signals through an environment—that is, predicting characteristics of a wireless channel—transmission, reception, coverage modeling, shared use, and general deployment and optimization of wireless systems for communications, radar, and other applications can be optimized. Predictions are generally based on wireless models that are approximations of the real world. For example, 5G cellular systems may leverage several simplified models such as time-delay-line (TDL) and cluster-delay-line (CDL) channel models, and other systems, such as citizens broadband radio service (CBRS), rely on tools such as height above average terrain (HAAT) models for propagation and coverage/interference modeling.

In addition, ray tracing has been employed to attempt to simulate radio wave propagation and reflection throughout an environment. Ray tracing modeling typically relies on a geometric model for an environment, e.g., a locale, geographic region, or facility. For example, the environment can be physically mapped, such as using Lidar-based 3D mapping, to obtain a 3D model of the environment, including terrain, buildings, obstacles, etc. Ray propagation through the 3D model can then be simulated (e.g., using material-based look ups for approximate RF properties of features in the 3D model) to predict wireless channel characteristics.

However, these existing ray tracing-based methods may be limited in various ways. For example, carrying out the ray-tracing simulations in 3D models dynamically (e.g., as UE moves throughout an environment) may be computationally cost-prohibitive. In addition, it may be impractical to obtain accurate 3D models, for example, in contested environments and in dynamic environments where frequent model updates would be necessary. Moreover, 3D-modeling-based ray tracing is fundamentally an indirect method that uses non-RF observations to attempt to model RF signal propagation behavior.

Instead, this disclosure describes methods and systems for channel estimation using RF observations such as impulse response, measurement of received signals, reflections, direct paths, etc. These methods can provide more utility than 3D-modeling-based ray tracing because the models used can be directly computed from RF data (e.g., using radiance field methods as described herein) at the desired frequency/band, and because the RF data reflects real-world measurements and effects which may differ from an idealized model or idealized material properties. Moreover, utilization of the models described (e.g., for channel estimation) may be less computationally demanding than corresponding calculations using 3D model ray tracing and/or other methods.

As shown in FIG. 1, an RF system 100 includes various network components, e.g., components associated with a radio access network (RAN), that can execute trained radio frequency radiance field models to control network operations. The system 100 can be associated with, for example, a 4G network, a 5G network, a 6G network, a 7G network, or another cellular network type.

The system 100 includes mobile devices 130, such as mobile phones, mobile computers (e.g., laptops/tablets), wearable devices, Internet of Things (IoT) devices, virtual reality/augmented reality (VR/AR) devices, etc., configured to transmit and receive data using the RAN. The system 100 can further include network-capable vehicles 132, such as drones, unmanned aerial vehicles (UAV), cars, trucks, robots, aircraft, etc., configured to transmit and receive data using the RAN. The mobile devices 130 and vehicles 132 can generally be referred to as user equipment (UE).

The UE performs network communication using a RAN architecture that includes a radio unit (RU) 102; a RAN Intelligent Controller (RIC) 110 that can, in some implementations, host one or more xAPPs, dApps, rAPPs, and/or zAPPs; a distributed unit (DU) 112; a central unit (CU) 120; and a cloud service 114. The RU 102 is a field-deployed hardware unit including RF hardware 104 configured to receive and/or transmit wireless RF signals (e.g., transceiver(s) and/or antenna(s)), an analog-to-digital converter configured to convert received analog RF signals into a digital form, and an RU computer system configured to process the digital RF signals in one or more ways (e.g., convert the digital RF signals into a packet form suitable for transmission through the RAN architecture) and output the processed digital RF signals to other components of the RAN architecture.

The DU 112 is a base station unit, e.g., forming a portion of a 5G-gNB. The DU 112 provides support for lower layers of the RAN protocol stack such as radio link control (RLC), medium access control (MAC) and physical layer. The DU 112 can include discrete hardware (e.g., as a base station device located physically at/near the RU 102) and/or can be wholly or partially virtualized. The DU 112 works in conjunction with the CU 120, which forms another portion of the base station unit. The CU 120 may be integrated, for example, into the cloud service 114 and/or other computer system(s). The CU 120 provides support for higher layers of the RAN protocol stack such as service data adaption protocol (SDAP), packet data convergence protocol (PDCP) and radio resource control (RRC), and interfaces with core network elements, such as the 5G Core in the case of a 5G network. The CU 120 can be located further from the RU 102 than the DU 112, e.g., as a back-end or mid-level hardware and/or software component, and can be wholly or partially virtualized.

The RIC 110 is a services layer that sits over the DU 112 and the CU 120 to perform control, optimization, and tuning of RAN functions. The RIC 110 can be divided into a non-real-time RIC and a near-real-time RIC. In some implementation, the non-real-time-RIC provides greater than one-second latency control of RAN elements and their resources, while the near-real-time RIC regulates actions that take between 10 milliseconds to one second to complete; these latency requirements can vary depending on the target timeline for sensing and recognition and reaction in the RAN architecture. In some implementations, the non-real-time RIC exchanges data with the near-real-time RIC (e.g., over an A1 interface), and the near-real-time RIC exchanges data with the DU 112 and the CU 120, e.g., over an E2 interface. The RIC 110 can be wholly and/or partially virtualized, e.g., as a hardware and/or software module. Some implementations of the RIC 210 can include a real-time RIC for real-time operations.

Operations of the RIC 110 can be performed using xAPPs, which reside in/execute on the near-real-time RIC. xAPPs are software tools/plugins, e.g., which can be cloud-native microservice-based applications. xAPPs operate using a public protocol, such that xAPPs can be developed by third-parties for use in the RAN architecture. In an example of an interaction between the RIC 110 elements and the DU 112/CU 120, the non-real-time RIC provides network metrics to the near-real-time RIC over an A1 interface. An xAPP executing in the near-real-time RIC obtains the network metrics and processes the network metrics to determine one or more control parameters for edge control of RAN elements, e.g., control of the DU 112 and/or the RU 102. The xAPP sends commands to the DU 112 over an E2 interface to actualize the control parameters. rAPPs and zApps, analogous to xAPPs, reside in/execute on the non-real-time RIC or in a real-time RIC respectively.

The cloud service 114 represents back-end distributed computing functions. For example, the cloud service 114 can implement core network functions, IP Multimedia Subsystem (IMS) functions, and/or other network-related functions. The cloud service 114 can include, for example, an edge-cloud, a regional-cloud, and/or a national-cloud.

As shown in FIG. 1, trained RF-RF models (which can be the same or different for components) can be deployed in one or more components of the system 100 and used to control RF transmission, reception, and/or processing. For example, outputs of RF-RF simulations (e.g., channel information such as power delay profiles (PDP)) can be used to control beamforming, scheduling, resource allocation, frequency band usage, and other parameters used for RF communication. The use of these RF-RF models can provide more efficient, more accurate channel analysis and, in doing so, improve the accuracy and efficiency of RF transmission, reception, and processing.

Although FIG. 1 illustrates a RAN, RF-RF models within the scope of this disclosure can further be deployed in devices and systems of other network types, such as Wi-Fi, wireless local-area networks (WLAN), wireless metropolitan area networks (WMAN), wireless personal area networks (WPAN), general mobile radio service (GMR) systems, telemetry systems, radar systems, etc.

Radio Frequency Radiance Field Models

The radio frequency radiance field (RF-RF) models referred to above are now described. These models can include, for example, neural radiance field (NeRF) models, neural graphics primitives (NGP) models, and Gaussian splatting models, each of which can be used with differentiable ray-tracing methods to estimate RF channel parameters and, in this manner, control RF transmission/reception.

NeRF methods based on imaging (i.e., visible-light photographs captured by cameras) were described by Mildenhall et al. in "NeRF: Representing Scenes as Neural Radiance Fields for View Synthesis" (2020). Those methods use multiple photographs of a scene, captured at multiple angles and from multiple positions, to train a model that represents the scene as a radiance field having parameterized density and color values. The model can then be used to predict images of the scene from arbitrary positions and at arbitrary angles by marching rays through the scene (as represented by the trained model) and determining characteristics of the scene at positions through which the rays pass. The differentiability of the NeRF approach allows the model to be trained using straightforward, efficient methods based on training images and a rendering loss calculated using a visual rendering function based on the ray marching. The same visual rendering function is used when predicting new images of the scene.

The RF-RF approaches discussed herein non-trivially extend the radiance field concept to the RF domain. Instead of using photographs, RF-RF models are trained using RF captures that provide snapshots of the RF characteristics of an environment. Moreover, RF-RF models, training, and use are adapted to account for time-domain effects which are irrelevant for visual NeRF for imaging but which are important when considering RF signal propagation, e.g., to estimate time of arrival (ToA), interference, etc.

Figure 2:
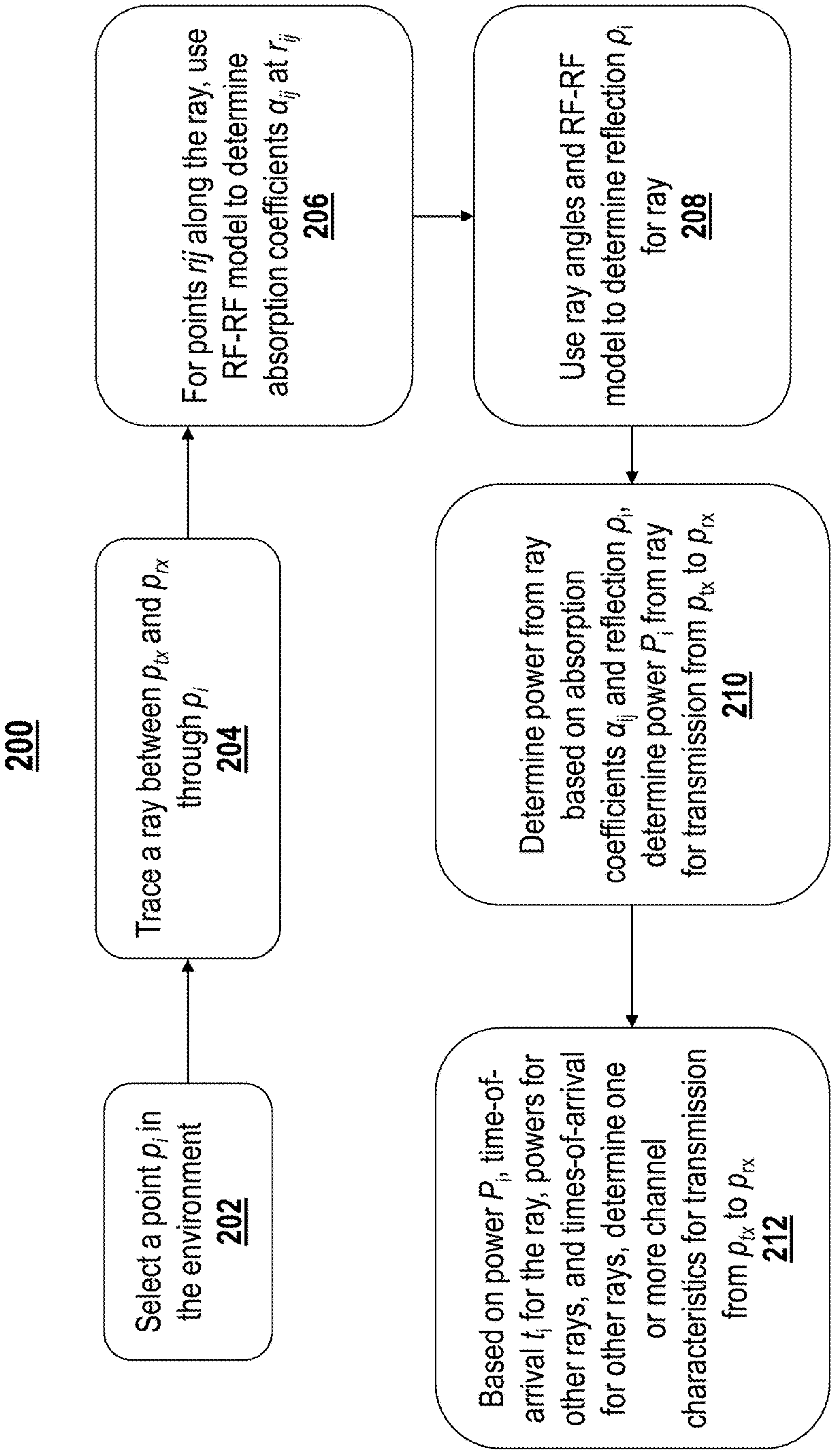
FIG. 2 is a diagram illustrating an example of a ray-tracing process.

FIG. 2 illustrates an example of a process 200 for using an RF-RF model to determine channel characteristics. In this example, the RF-RF model is applied to determine a power delay profile (PDP) for transmission from a first position $p_{tx}$ to a second position $p_{rx}$, but the RF-RF models discussed herein can also be used to calculate other channel characteristics of interest, such as channel state information (CSI) including impulse responses and received power. It will be understood that the process 200 is a non-limiting example of the types of ray-tracing-based processes, within the scope of this disclosure, that can be performed using RF-RF models as described herein.

As discussed in further detail below, the process 200 and other ray-tracing-based processes for channel estimation can be performed by any suitable computing device or system and, in particular, by any of the devices and systems shown in FIG. 1.

Figure 3:
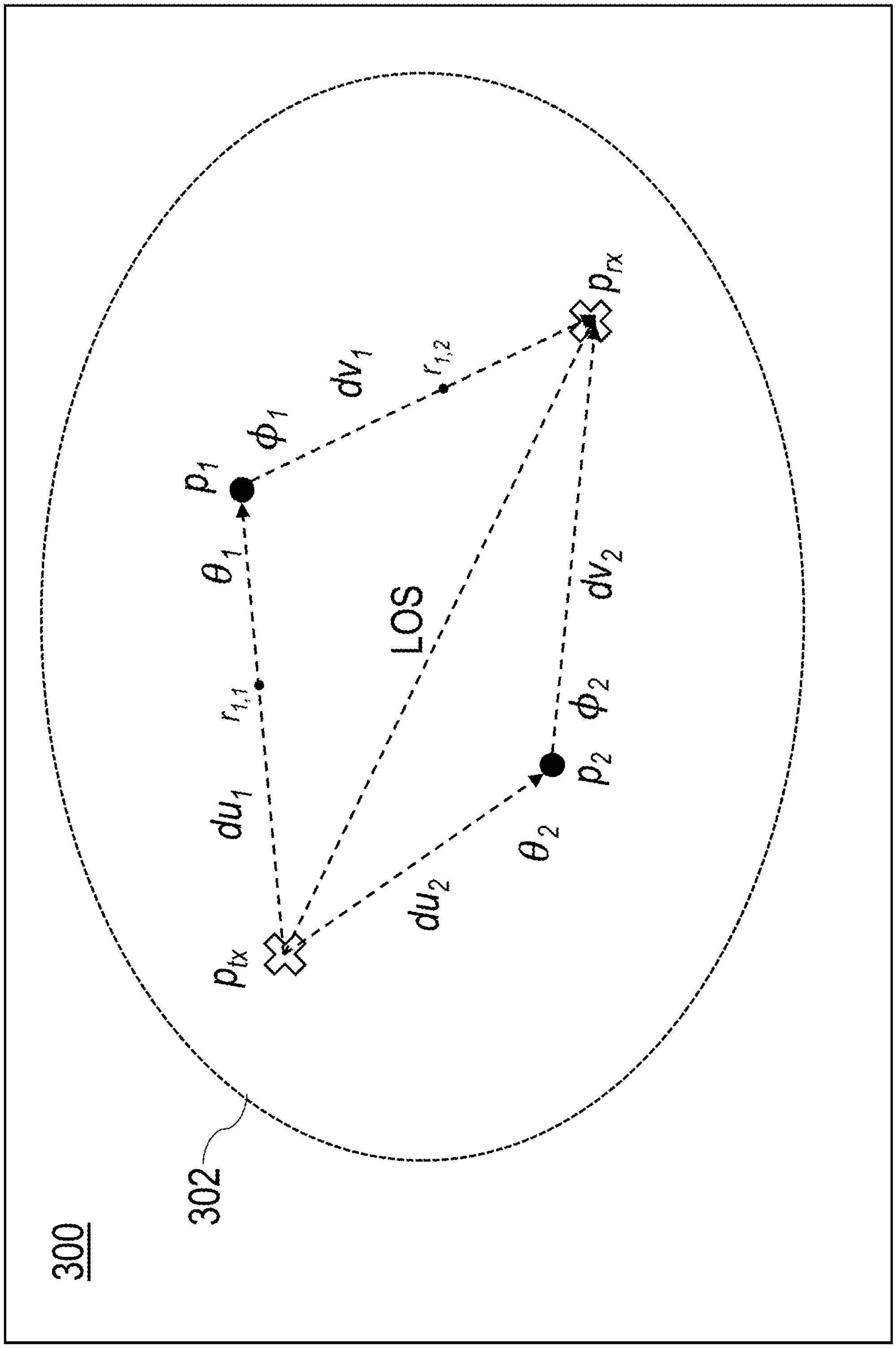
FIG. 3 is a diagram illustrating an example of rays in an environment.

The process 200 including selecting a point $p_i$ in the environment (202). For example, as shown in FIG. 3, point $p_i$ is selected in an environment 300 in which a transmission point $p_{tx}$ and a reception point $p_{rx}$ are located. For example, the transmission point $p_{tx}$ can correspond to the position of an RF transmission such as a base station, and the reception point $p_{rx}$ can correspond to the position of an RF receiver such as mobile UE, a sensor device, etc. In some implementations, the point $p_1$ is selected from within a bounded region 302, e.g., as opposed to from anywhere in the environment 300. The point $p_i$ can be selected randomly from within the environment 300 or from within the bounded region 302. In some implementations, the random selection is performed with one or more constraints, e.g., to ensure that selected points are sampled from across the environment 300 or the bounded region 302 as opposed to overly-sampling one specific area. When the RF-RF model is utilized for network control, and when the RF-RF model is trained, the points $p_{tx}$ and $p_{rx}$ can correspond to known positions of the transmitter and receiver. When the RF-RF model is used for hypothetical simulations, network deployment configuration, and device localization, at least one of $p_{tx}$ and $p_{rx}$ may be a hypothetical position or a position being tested.

The bounded region 302 can be determined (e.g., by the same device/system performing the process 200) based on a maximum delay and/or path length for consideration. For example, a maximum path length can be selected or predetermined, over which attenuation for RF signal propagation is expected to be too large to provide significant reflective components for transmission for $p_{tx}$ to $p_{rx}$. The maximum path length can correspond to a three-dimensional shape, such as an ellipsoid, that defines the bounded region 302. For example, the three-dimensional shape/region can be determined by computing a distance at which free-space path loss results in a signal amplitude that is so small as to be practically undetectable, to establish a maximum "useful" distance. This distance can then be used in reference to $p_{tx}$, e.g., as defining a dimension such as radius, side length, semi-major axis length, etc., of the three-dimensional shape. In some implementations, the determined distance is used as a basis for further computations based on which the three-dimensional shape is determined.

A ray (e.g., an i-th ray) is traced between the transmission point $p_{tx}$ and the reception point $p_{rx}$ through the selected point $p_i$ (204). As shown in FIG. 3, a ray from $p_{tx}$ to $p_{rx}$ through $p_1$ includes a first segment $du_1$ from $p_{tx}$ to $p_1$, and a second segment $dv_1$ from $p_1$ to $p_{rx}$. In this example, a single point $p_i$ is selected corresponding to each ray, such that each ray includes two segments. In some implementations, additional points can be selected such that each ray includes more than two segments, e.g., to include higher-order reflections in the modeling.

Sample points $r_{ij}=(x,y,z)_{ij}$ along the i-th ray are selected. In some implementations, $r_{ij}$ are uniformly distributed, e.g., at periodic intervals along the ray. In some implementations, another sampling method can be used. For example, sampling points can be learned and/or biased based on predicted objects and density in the environment.

The points $r_{ij}$ are evaluated using a trained RF-RF model to determine corresponding absorptions (e.g., values of absorption coefficients) $\alpha_{ij}$ (206). For example, the points $r_{ij}$, and/or encoded versions thereof, can be provided as input to the RF-RF model, which is trained to output $\alpha_{ij}$ or an encoded version thereof. As shown in FIG. 3, sampled points along a first ray through $p_1$ can include $r_{1,1}$ and $r_{1,2}$, which can be processed by the RF-RF model to determine corresponding absorptions $\alpha_{1,1}$ and $\alpha_{1,2}$. The RF-RF model represents an encoding of the environment 300, including absorption characteristics of the environment 300, such that the absorptions $\alpha_{ij}$ represent predicted degrees of RF absorption at the corresponding points $r_{ij}$. In some implementations, values of transmittance metrics are determined instead of or in addition to absorptions; it will be understood that the determination or output of one is equivalent to determination or output of the other, because they are related by transmittance=1-absorption.

In addition, one or more angles associated with the ray are used with the RF-RF model to determine a reflectance (e.g., a reflection coefficient) $\rho_i$ associated with the ray (208). For example, as shown in FIG. 3, the ray through $p_i$ is associated with a first angle $\theta_1$ characterizing the direction of the first segment $du_1$ and a second angle $\phi_1$ characterizing the direction of the second segment $dv_1$, and the RF-RF model can be used to determine (e.g., a value of) a corresponding reflectance $\rho_1$. The angles $\theta_i$ and $\phi_i$ can be multi-dimensional angles, e.g., two-dimensional values such as unit vectors in 3D space. The angles $\theta_i$ and $\phi_i$ are included in the analysis because reflection is a direction-dependent parameter. The point $p_i$ and the angles $\theta_i$ and $\phi_i$, and/or encoded versions thereof, can be provided as input to the RF-RF model, which is trained to output $\rho_i$ or an encoded version thereof. The RF-RF model represents an encoding of the environment 300, including reflection characteristics of the environment 300, such that the reflectance $\rho_i$ represents a degree of reflection from $p_i$ toward $p_{rx}$ for RF signals from $p_{tx}$. Notably, the reflectance $\rho_i$ can be learned without assuming the applicability of Snell's law or other material and structure-specific assumptions.

The process 200 further includes determining a power level $P_i$ for RF transmission from $p_{tx}$ to $p_{rx}$ along the i-th ray (210). As an example of this calculation, in some implementations, $P_i$ can be calculated as $P_i=P_{tx}T_iL_i\rho_i$, where $P_{tx}$ is the transmission power, $T_i$ is the transmittance along the i-th ray, $L_i$ is the path loss along the i-th ray, and $\rho_i$ is the reflectance associated with the i-th ray, as described above. The inclusion of $P_{tx}$ in the foregoing expression permits the estimation of absolute received power levels, e.g., in addition to (in some cases) relative/proportional received power levels. Moreover, in some implementations, the $P_{tx}$ term is used to include directivity/angular power of emission in the expression, e.g., where different emission angles have different corresponding $P_{tx}$.

The parameters used to determine $P_i$ can themselves be determined according to the following expressions, which are non-limiting examples. Transmittance $T_i$ can be determined using $$T_i = \prod_{j=1}^{n} (1 - \alpha_{ij})^{\Delta_{ij}},$$

that is, as a product over the absorptions $\alpha_{ij}$ calculated for the sampled points along the ray, where $\Delta_{ij}$ is the distance along the ray between successive sampled points, e.g., j and j−1. Path loss can be determined using $$L_i = \frac{4\pi f(du_i + dv_i)^2}{c}$$

(e.g., as the free-space path loss), where f is the RF signal frequency, c is the speed of light, and $du_i$ and $dv_i$ here denote the respective lengths of the two segments of the i-th ray. It should be noted that $\alpha_{ij}$ and $\rho_i$ are outputs of, or are determined based on outputs of, the RF-RF model, such that $P_i$ is determined based on outputs of the RF-RF model.

Another parameter of relevance is the time-of-arrival associated with the i-th ray, that is, $$t_i = \frac{du_i + dv_i}{c} \cdot t_i$$

$t_i$ is the time taken for light to traverse the i-th ray from $p_{tx}$ to $p_{rx}$. This parameter is not of interest in visual NeRF for image generation. However, for purposes of this disclosure, it has been recognized that temporal factors should be integrated into radiance field modeling for channel estimation, e.g., for estimation of time-domain characteristics such as impulse responses, PDPs, interference estimation, and other channel effects. Unlike visual light sources which are continually integrated and reflect an instantaneous power-level property, the propagation of RF "rays" within an environment can be characterized using an impulse response, e.g., the emission of a Dirac delay. That is, an instantaneous impulse of energy arrives with some delay and amplitude at a receiver, and may include multiple components at different delays and amplitudes which travel along different paths and path lengths, and undergo different effects such as reflection, diffractions, absorption, etc. This process can be characterized using a PDP, rather than simply an instantaneous pixel amplitude (brightness) and color which would be typical in the visual domain. The systems and devices described herein can be configured to generate PDPs and other time-domain channel characteristics using RF-RF models for useful and efficient RF analysis.

Referring again to FIG. 2, the process 200 includes, based on the power $P_i$, the time-of-arrival $t_i$, powers for other rays, and times-of-arrival for other rays, determining one or more channel characteristics for transmission from $p_{tx}$ to $p_{rx}$ (212). For example, in the case of FIG. 3, the other rays can include an illustrated second ray passing through $p_2$. The powers and times-of-arrival for the other rays can be determined as described above for the first ray/ray through $p_i$. For example, an estimated aggregate received power $E(P_{rx})$ can be calculated as an integral or sum over all the rays corresponding to all the $p_i$, e.g., $$E(P_{rx}) = \sum_{i=0}^{n} P_i / n,$$

where n is the number of traced rays. As another example, the estimated power delay profile (PDP) can be calculated as a set of all the power levels and corresponding times-of-arrival, e.g., PDP={$P_i$, $t_i$} (e.g., in some cases with appropriate normalization, integration/spatial interpolation, etc.).

In some implementations, a channel impulse response is determined. The estimated channel characteristics are accordingly determined based on outputs of the RF-RF model.

As shown in FIG. 3, in some implementations, besides rays that pass through an intermediate position $p_i$, a ray along a direct line-of-sight path LOS, directly from $p_{tx}$ to $p_{rx}$, can be included in the analysis, e.g., including calculation of RF power received on the LOS and a time-of-arrival for the LOS.

In some implementations, channel estimation/emulation/simulation (e.g., ray-tracing, power calculation, etc.) can be based on rays represented as a complex value, e.g., with determination of an arriving amplitude and phase of for each ray or PDP element, where the amplitude and phase may change as the rays propagate (e.g. in a periodic or helical fashion), or where the amplitude and phase may be modified by values from the absorption MLP as part of the ray tracing function (e.g. the light wavelength may be modeled as changing when passing through certain mediums, and/or wave phase and/or direction may be modeled as changing when reflecting or refracting through certain mediums as well). In some implementations, the rays can be represented as real magnitudes only. In some implementations, the reflection coefficients may represent real-valued magnitude scalars, and in some implementations the reflection coefficients may represent complex-valued amplitude and phase shifts associated with reflection. Each of these real- or complex-valued ray tracing approaches may be associated with certain contexts in which they may provide particular advantages. For instance, when modeling fast-fading due to destructive phase interference from reflections, it may be important to model phase and polarization of the propagating rays accurately, such that the complex-valued approach may be beneficial. However, in some implementations a complex-valued model may use more data and more fine-grained modeling (e.g., on the order of the wavelength of the light) to train the model and simulate propagation accurately, as compared with real-valued models that take a magnitude-focused or real-valued approach to ray tracing.

The foregoing equations provided with respect to the process 200 constitute a non-impulsive rendering function and approach for RF channel estimates, adapting previously visual-only methods for the RF domain. In communications systems, modeling of delay can be an important function, as few practical propagation channels are truly impulsive (delivering energy instantaneously at one moment). Rather, real-world communications systems typically exhibit delay spread, e.g., from multi-path fading, dispersion, and/or other effects which spread transmitted signal energy out over time. This aspect of signal propagation is often important to model, as it can lead to effects such as inter-symbol interference and other types of degradation that have to be compensated for by the communications system. For example, in many systems, such as systems incorporating orthogonal frequency-division multiplexing (OFDM), a cyclic-prefix is introduced to allow for transient time-intervals on the order of the delay spread to occur without degrading the signal. In some systems multiple paths or reflections may be exploited for additional capacity (e.g., via multiple-input-multiple-output (MIMO) approaches), and in some systems the encoding, decoding, and/or modulation may be adapted in order to help compensate for or remove delay spread effects from the signal at the transmitter and/or receiver. In these and other circumstances, it may be useful to accurately model this delay within the channel response in order to accurately simulate a wide range of wireless propagation conditions. In some implementations, each delay may be associated with a Doppler or frequency offset associated with it (e.g., when moving emitters, receivers, or reflectors are involved).

Figure 4:
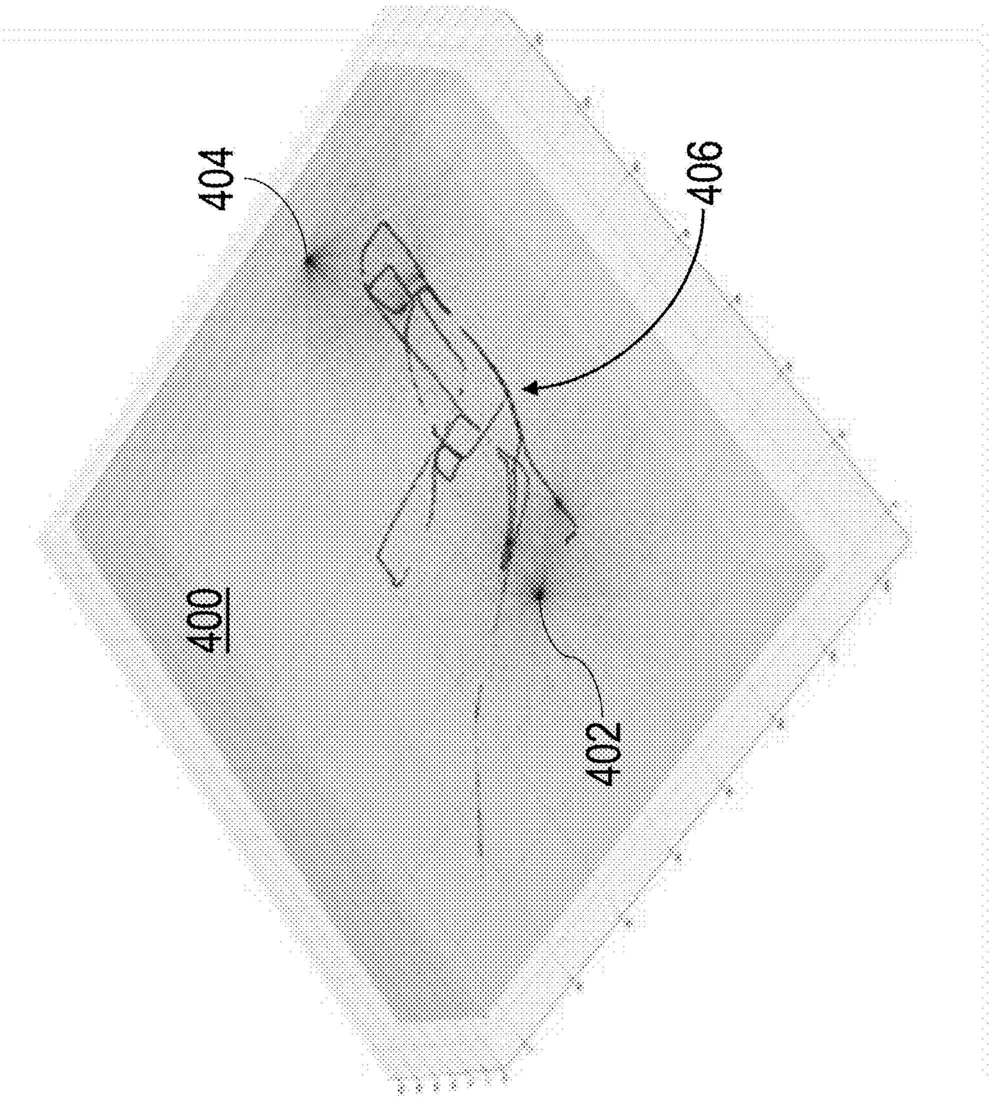
FIG. 4 is an example of a ray-tracing simulation.

FIG. 4 illustrates an example of a ray-tracing simulation, showing rays traced in an environment 400 between a transmission position 402 and a reception position 404. Rays emanate from each of the positions 402, 404. The dark path 406 represents a path along which a RF receiver was moved during data collection to sample data (e.g., PDP) for subsequent model training FIG. 4 illustrates sampling locations within the environment which may serve as reflectors between positions 402 and 404, in order to evaluate reflected rays originating at 402, reflecting through the sampled point, and terminating at position 404. By evaluating the ray gain, absorption, time delay, and/or other properties along the ray path to and from a sample location (e.g. by using a radiance field model which stores these properties), along with the reflectance of the incoming and outgoing angles of the rays reflecting at the sampling locations (e.g., in order to determine the reflectance and gain at that angle), the contribution due to the corresponding reflecting path can be determined. Through summing over many paths and possible reflectors, a sample for the full impulse response or power delay profile may be estimated from the transmission position 402 to the reception position 404.

Figure 5:
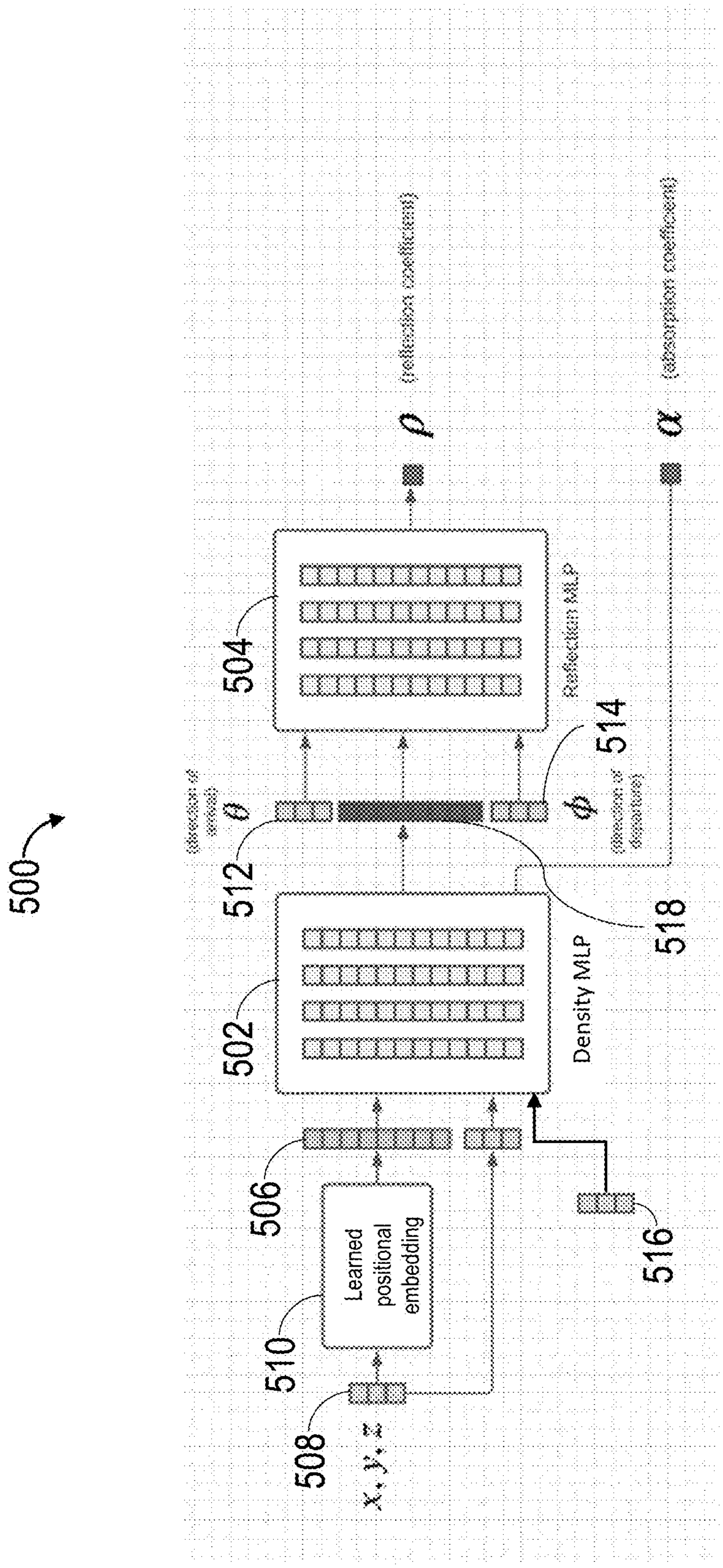
FIG. 5 is a diagram illustrating an example of a radio-frequency radiance field (RF-RF) model.

Various types of machine learning models and machine learning architectures can be used to implement the RF-RF models described herein. FIG. 5 illustrates a non-limiting example of such an architecture, showing an RF-RF model 500 that includes two concatenated multilayer perceptron (MLP) networks (training of the RF-RF model 500 is discussed below in reference to FIG. 6). A material MLP 502 is trained to receive, as input, positions 508 and/or positional embeddings 506 (an example of encoded positions), and to output (directly or in encoded form) absorptions $\alpha$. For example, the density MLP 502 can be used to determine the absorptions $\alpha_{ij}$ in operation 206 discussed above, e.g., by receiving, as inputs, positions along traced rays. The material MLP 502 can be referred to as a “material” MLP because, in some implementations, the material MLP 502 encodes the material properties for different points in space (for example, absorption and/or reflectivity). A reflection MLP 504 is trained to receive, as input, directions of arrival $\theta$ and/or direction of departure $\phi$(512 and 514), along with output 518 of the material MLP 502, and to output (directly or in encoded form) reflectances $\rho$. For example, the reflection MLP 506 can be used to determine the reflectances $\rho_i$ in operation 208 discussed above, e.g., by receiving, as inputs, positions $p_i$ that define traced rays. In some implementations, the concatenated processing by the MLPs 502, 504 can be understood as the material MLP 502 outputting (based on embedding in the material MLP 502) properties of a material at the positions 508 (e.g., reflectivity, absorption, material/object orientation, and/or one or more other properties), and the output 518 is then conditioned on the direction(s) $\theta$ and/or $\phi$, which represent angle of arrival (AOA) and angle of departure (AOD) using the reflection MLP 504.

The RF-RF model 500 further includes a learned position embedding module 510 that is configured to receive, as inputs, positions 508 in the environment (e.g., positions of points $p_i$ and positions $r_{ij}$ along rays) and to output positional embeddings 506 that represent the positions 508. For example, the positional embeddings 506 can be higher-dimensional embeddings of the positions 508. In some implementations, the learned position embedding module 510 performs a transmitter- and receiver-independent vector mapping between the positions 508 (e.g., (x, y, z)) and a learned, higher-dimensional vector space that encodes properties discovered through back-propagation from the material MLP 502. For example, the positional embeddings 506 can be n-dimensional, where n is an integer greater than 3. In some implementations, the use of the positional embeddings 506 can allow the RF-RF model 500 to better model abrupt changes or high-frequency features of the environment that occur along slowly-changing positional inputs.

The learned position embedding module 510 can be trained during training of the MLPs 502 and/or 504, e.g., by adjusting weights and/or other parameters of the position embedding module 510 that determine a mapping between the positions 508 and the positional embeddings 506. In some implementations, the learned position embedding module 510 is trained as a multiresolution hash encoder (to perform multiresolution hashing to generating the positional embeddings 506 as discussed below) or to generate the positional embeddings 506 based on a set of random Fourier features. The positions 508 can be provided as volumetric locations (x,y,z) or in another suitable coordinate system.

In some implementations, the learned position embedding module 510 is configured as a multiresolution hash encoder, e.g., as set forth by Muller et al. in "Instant Neural Graphics Primitives with a Multiresolution Hash Encoding" (2022). For example, the environment can be represented in voxel form, and a given position (e.g., $p_{tx}$, $p_{rx}$, $p_i$, and/or $r_{ij}$) can be encoded based on a linear interpolation of feature vectors corresponding to corners of surrounding voxels. Parameters of the voxels and encoding can be determined through training/back-propagation in operation 616 discussed below. In some implementations, the use of a multiresolution hash encoding can significantly speed up training and estimation. In some implementations, a multiresolution hash encoder as the learned position embedding module 510 can be configured to output spherical harmonic basis coefficients which are processed by the MLPs 502 and/or 504 to produce absorption and reflection as a function of the coefficients and angles $\theta_i$ and $\phi_i$. For example, the spherical harmonic basis coefficients can be associated with the absorption coefficient and/or the reflection coefficient, such that an output of the learned position embedding module 510 can output absorption and/or reflection as a function of one or both of $\theta$ and/or $\phi$, e.g., as opposed to conditioning a trained model output on $\theta$ and/or $\phi$ as shown for MLP 504. In some implementations, the RF-RF model 500 does not include a material MLP 502. For example, the positional embedding (e.g. the multiresolution hash encoding, or other embedding) may directly output properties like absorption or reflection coefficient for one specific location in space. Various embeddings can be used by the learned position embedding module 510 in various implementations, for example, using random Fourier features, to provide a non-limiting example.

The RF-RF model is not limited to the architecture shown in FIG. 5. That is, the RF-RF model can include one or more other machine learning model types instead of, or in addition to, MLP(s), and the RF-RF model can be structured differently than shown in FIG. 5. In various implementations, the RF-RF model can include any one or more suitable types of machine learning network and/or parametric function, including neural network(s), e.g., convolutional neural networks, recurrent neural networks, feedforward neural networks, perceptron networks, deep neural networks, etc. Moreover, the RF-RF model need not include two networks that output absorption and reflection, respectively, as shown in FIG. 5. Rather, the RF-RF model can include one, two, three, or more networks that together are trained to provide outputs for use in channel estimation, as described herein. For example, a single network can be trained to output both absorption and reflection, or two or more networks can be configured differently from the architecture of FIG. 5. When the RF-RF model includes two or more networks, inputs/outputs of the networks can be entirely distinct/independent, and/or an output of one network can be provided as input to another network, without departing from the scope of this disclosure.

In some implementations, the RF-RF model can implement a plenoptic approach, for exampled, as described in Yu et al., "Plenoxels: Radiance Fields without Neural Networks" (2021). The RF-RF model is trained to learn a series of basis coefficients (e.g., through a gradient descent or other training approach, as described with respect to operation 616 below), and the coefficients are combined as spherical harmonics through a parametric function of the RF-RF model to produce an embedding of material properties (e.g., angular reflectivity, reflectivity, absorptivity, orientation, etc.) that can be used to obtain predicted absorptions and reflections for positions as rays, as discussed throughout this disclosure. The environment can be represented as a sparse voxel grid having the spherical harmonic coefficients at each voxel, the voxel representation being trained through back-propagation.

In some implementations, the RF-RF model can be configured to receive, as input, one or more other variables, such as conditional/contextual factors. For example, the MLPs 502, 504 (or other machine learning network(s) included in other architectures of the RF-RF model) can encode time of day, temperature, weather or other environment properties, frequency bands, signal modulations, beam parameters (e.g., beam shape), etc., which can allow the RF-RF model to generalize across a broad range of factors and conditions in a well-conditioned way. For example, the MLPs 502, 504 can further be trained to receive, as input, any of these and/or other variables so as to produce outputs that depend on these and/or other variables, e.g., to output different absorptions and/or reflections for different RF frequencies, weather conditions, etc. The RF-RF model can be configured in this manner at least based on the training of the RF-RF model, as discussed below in reference to FIG. 6, and, in some cases, these and/or other variables can be provided optionally as input to the RF-RF model, e.g., as shown for additional input 516 in FIG. 5.

In some implementations, the RF-RF model can be trained to produce different outputs for different emitters and/or receivers. For example, each UE, base station, etc., can have an antenna pattern that can be learned and encoded in the RF-RF model, to predict propagation from $p_{tx}$ to $p_{rx}$ of signals emitted by and/or received by a particular UE or base station, or type/model of UE or base station. An identifier of the emitter and/or receiver can be provided in the additional input 516 so that the RF-RF model provides emitter and/or receiver-specific outputs, e.g., absorption and reflection, to result in emitter and/or receiver-specific channel characteristics such as PDP. In some implementations, to configure the RF-RF model in this manner, training (in operation 616 discussed below) can start with an initial set of coefficients representing an emitter's or receiver's antenna pattern (e.g., start by assuming spherically-uniform transmission/reception or assuming a standard pattern for a type of an antenna, such as a 120-degree base station sector antenna), and the coefficients can be modified during the training (based on back-propagation) to reduce loss and produce an estimate for the emitter's and/or receiver's antenna pattern. For example, the antenna patterns can be represented as spherical harmonics. In some implementations, spherical harmonics can be particularly effective for use in RF-RF modeling, because spherical harmonics provide a compact way to represent a two- or three-dimensional antenna gain pattern as a concise basis function, such that spherical harmonics are a useful way to estimate an RF emission surface using the methods described herein. Moreover, in some implementations, the spherical harmonic representation can be particularly storage-efficient and/or computationally-efficient when processed.

The learned antenna pattern can be encoded in weights of the RF-RF model. In some implementations, the antenna pattern is known (e.g., for a known emitter) and can be used directly, e.g., as an input for predicting channel characteristics for emission from the antenna. The antenna pattern need not be (though can be) incorporated directly into the architecture of the RF-RF model. For example, in some implementations, the antenna pattern (whether learned or predetermined) is incorporated into the RF-RF modeling process by incorporating an additional factor $A_i$ into the power formula $P_i=P_{tx}T_iL_i\rho_iA_i$, where $A_i$ can, for example, indicate a proportion of power emitted in a direction corresponding to the i-th ray or a proportion of power received in the direction corresponding to the i-th ray. In some implementations, $A_i$ can be the antenna pattern modeled as a spherical harmonic basis function, and $A_i$ can be learned during model training or set as a known antenna pattern.

In some implementations, the RF-RF model is deterministic and produces fixed output values for each input and embedding. In some implementations, the RF-RF model is configured to apply a probabilistic approach, e.g., by including a variational sampling component within one or more of the machine learning models/networks of the RF-RF model.

In some implementations, the RF-RF model is configured to implement Gaussian splatting for RF signal propagation simulation. In such implementations, the environment is represented as a series of volumetric regions having non-zero parametric properties. Through training, these "splats" can be embedded with RF properties such as reflectance, admittance, and absorption, allowing the RF-RF model to learn varying densities of information and focus training on regions that are most important for simulating ray propagation. Gaussian splatting for visual image generation and scene reconstruction is described in Kerbl et al., "3D Gaussian Splatting for Real-Time Radiance Field Rendering" (2023). Positions along a ray are evaluated as described above, using learned splat data along the ray. For example, each splat can learn (e.g., as represented by a set of spherical harmonics or otherwise) an intensity of outgoing energy at each angle, e.g., in some cases as a function of the input angle.

Gaussian splatting can be adapted in various ways for RF signals as opposed to visual image-generation purposes. For example, while visual Gaussian splatting operates in three dimensions (e.g., as "3D Gaussian splatting"), RF Gaussian splatting can add a fourth dimension for each ellipsoid (splat), the fourth dimension being a time delay at which energy is present. Time delay may be related to the distance a ray travels, for example, between $p_{tx}$ and $p_{rx}$ and between splats. Splats can be trained to embed a time at which a ray from an emitter passes through the splat (relative to an input impulse) and/or to embed information about the speed at which the ray may pass through the local medium.

As another example, while visual Gaussian splatting parametrizes and learns colors and opacity (RGBA) for each ellipsoid, some implementations of RF Gaussian splatting can learn one channel (analogous to a "color channel" in visual Gaussian splatting) per transmission source (e.g., transmit base station), the color channel encoding different emitters/sources. This results in encoded static emitter locations, e.g., as a "fixed illumination" RF-RF model. In fixed illumination implementations, a set of spherical harmonics can be learned for each splat, the spherical harmonics encoding the intensity of outgoing energy for each angle of departure for each transmitter (in some cases, learned as a function of the input angle). PDP can be determined by simulating ray propagation for many rays (from $p_{tx}$ to $p_{rx}$) arriving at different time delays and angles, as discussed above in reference to FIGS. 2-3, e.g., by integration and/or random sampling. In some implementations, different channels can be learned for different frequencies.

In some implementations, a Gaussian splatting RF-RF model includes an adjacency data structure that stores parameters for each splat and facilitates rapid discovery and/or discovery of adjacent splats and/or splitting of splats into multiple splats. This can facilitate rapid ray tracing through nearby locations. Moreover, in some implementations this data structure can facilitate selection of "nearby delays": because a splat has a location and a delay-related dimension, the adjacency data structure can facilitate splats having similar locations and the corresponding delays at which energy is present at those splats. Accordingly, ray-tracing through the data structure can be performed rapidly, because rather than unguided sampling of points in space, the data structure can guide rays for efficient sampling.

A Gaussian splatting RF-RF model need not include a neural network but, rather, can be a data structure storing splat locations, corresponding splat sizes, and corresponding splat parameters, any or all of which can be learned in a training process. In some implementations, geometry/characteristics of an environment can be learned/embedded in a list of splats, where each splat is trained to represent a source of energy at a specific delay and amplitude (e.g., in a fixed illumination configuration).

RF-RF Model Training and Deployment

As noted above, the RF-RF models described herein can be trained based on RF captures in an environment, such that the RF-RF models learn RF-specific embeddings of the environment. For example, rather than relying only on indirect methods to model RF signal propagation (e.g., modeling signals in 3D models obtained by Lidar or another imaging method), the RF-RF models can directly represent RF characteristics to produce more accurate channel estimates that, for example, are based on embeddings of subtle, RF-specific features.

Figure 6:
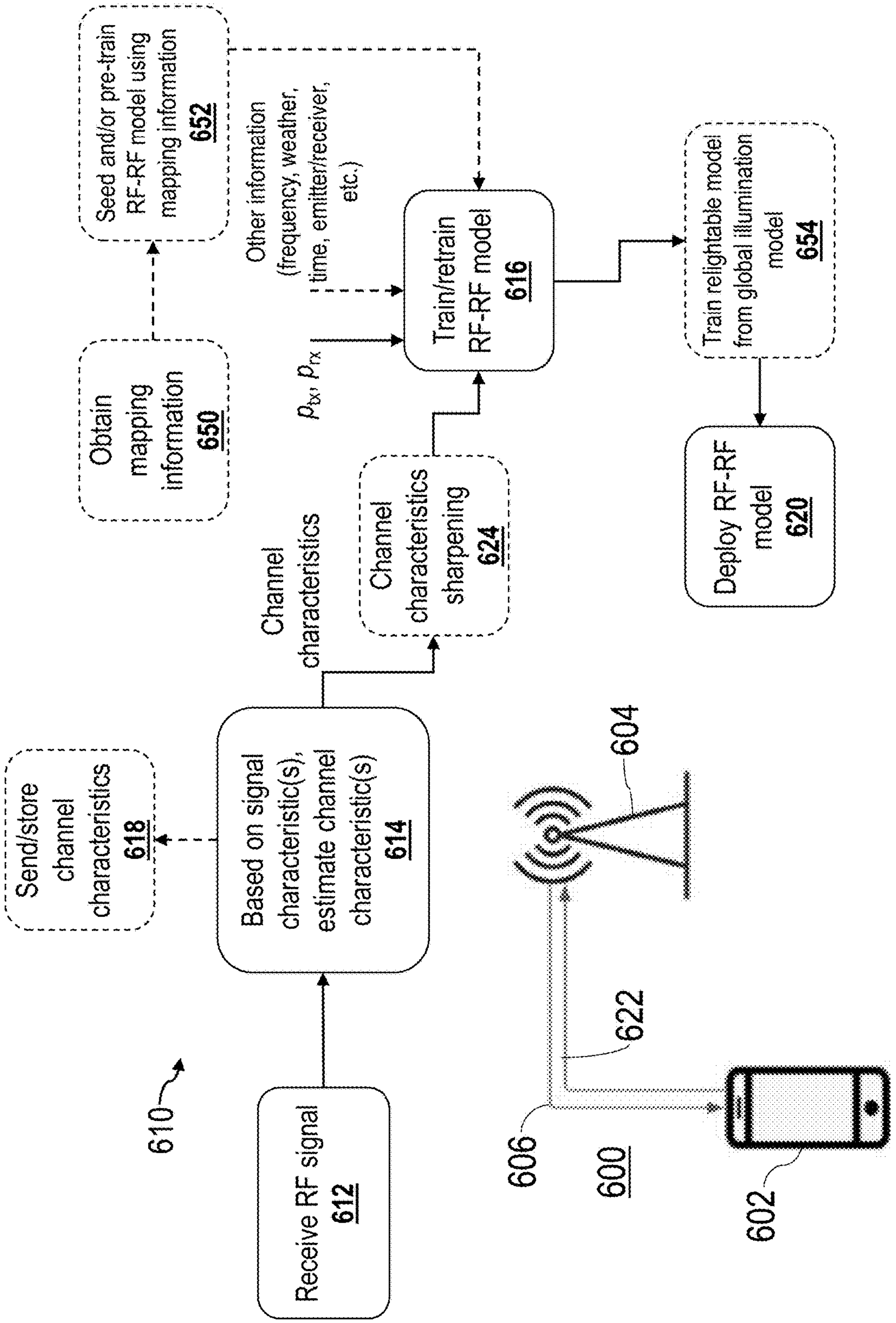
FIG. 6 is a diagram illustrating an example of a communication system and an RF-RF model training process.

FIG. 6 illustrates a communication system 600 and a corresponding process 610 for training (including, in some implementations, retraining) an RF-RF model, e.g., the RF-RF models described in the previous sections, such as the RF-RF model 500 or an RF-RF model used in operation 206. The system 600 includes a receiver 602 (e.g., a mobile device) and a transmitter 604 (e.g., a radio access network (RAN) base station) configured to transmit RF signals 606 to the receiver 602. For example, the system 600 can be a cellular radio access network (RAN) (e.g. 4G, 5G, 5G Advanced, 6G, 6G Advanced, 7G, etc.) or another type of wireless system such as Wi-Fi, a wireless local-area network (WLAN), a wireless metropolitan area network (WMAN), a wireless personal area network (WPAN), a general mobile radio service (GMR) system, a telemetry system, a radar system, etc.

The process 610 includes receiving the RF signal 606 at the receiver 602 (612). The RF signal 606 can be a generic signal (e.g., carrying data that need not be specifically-configured for channel estimation), and/or can include one or more features that facilitate channel estimation. For example, the RF signal 606 can include a sounding signal, a reference tone (e.g., a preamble sequence or a pilot sequence), or another predetermined signal/sequence. In some implementations, the RF signal 606 can include a downlink signal such as a physical broadcast channel (PBCH) transmission, a physical downlink control channel (PDCCH) transmission, a physical data shared channel (PDSCH) transmission, a demodulation reference signal (DMRS) transmission, etc.

One or more characteristics (sometimes referred to as "channel estimates" or as "channel state information" (CSI)) of the wireless channel between the transmitter 604 and the receiver 602 are determined based on characteristics of the received signal 606 (614), for example, based on the sounding signal, reference tone, and/or other predetermined signal/sequence in the received signal 606 (e.g., estimated based on a PUSCH, DMRS, or PBCH, a data structure corresponding to those protocols/signal types, etc.). The characteristics of the wireless channel can include, for example, a channel tensor H, a PDP, an impulse response, and/or another estimate of how RF signals propagate from the transmitter 604 to the receiver 602. These estimates are "measured" estimates based on measured/collected RF data, as opposed to outputs of the RF-RF model which are predictive estimates. For example, the determined characteristics of the wireless channel can represent the effects of one or more of scattering, fading, or power decay with distance, e.g., the characteristics of the wireless channel can include a PDP or other CSI. The characteristics of the wireless channel can be determined, for example, in the time domain and/or in the frequency domain. The received signal 606 can be processed in an orthogonal frequency-division multiplexing (OFDM) format, e.g., an OFDM grid format. Determining the characteristics of the wireless channel can include, as a non-limiting example: performing pilot/reference extraction on symbols in the received signal 606; normalizing aspects of the received signal 606 (e.g., normalizing values corresponding to elements of a resource grid); and determining the channel characteristics based on a comparison between the extracted symbols and ground-truth values such as demodulation reference signal (DMRS) values, which can include, for example, performing demultiplication.

Operation 614 can be performed using any suitable method, e.g., non-machine-learning based methods (e.g., using an LTE toolbox compatible with a numerical programming environment, using zero-forcing channel estimation followed by interpolation, etc.) and/or using a machine-learning-based method such as that described in US Patent Application Publication No. 2023/0342590, incorporated herein by reference in its entirety. Operation 614 can be performed by the receiver 602 (e.g., using a computing device of the receiver 602, such as a computing device in UE) and/or by another computing device or computing system to which characteristics of the received signal 606 (e.g., a resource grid) are sent by the receiver 602. For example, the receiver 602 can send the signal or features thereof to a DU, a CU, a RIC App, or a cloud computing system, which performs the channel estimation. In some implementations, the channel estimates are determined using a protocol-specific estimator (e.g., based on a classifier's decision of a protocol type of the received signal). In some implementations, the channel estimates are determined using blind equalization.

Although process 610 is discussed in the context of a mobile device receiving signals from a transmitter (e.g., a static transmitter), training can additionally or alternatively be performed using a mobile transmitter and a stationary receiver, e.g., where a mobile device transmits signals to a base station, the base station receives the signals, and training is performed based on the received signals. In such implementations, the process 610 can be applied to uplink transmissions 622 such as physical random access channel (PRACH) transmissions, physical uplink control channel (PUCCH) transmissions, physical uplink shared channel (PUSCH) transmissions, DMRS transmissions, etc., received at the base station.

As shown in FIG. 6, in some implementations, the determined channel characteristics are sent to another system and/or stored for later retrieval (618). For example, a channel tensor H and/or a PDP determined at the receiver 602 can be sent from the receiver 602 to a remote storage or system, such as the RIC 110, the cloud service 114, etc. In some implementations, other information to be used for training (e.g., the $p_{tx}$ and $p_{rx}$ corresponding to the received signal) can also be sent. The stored data can later be retrieved and used for training.

Figure 14A:
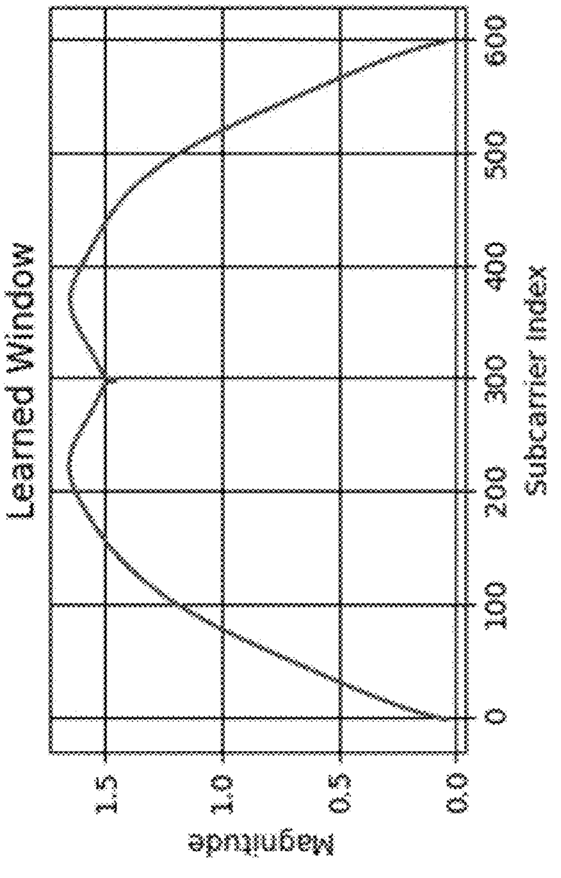
FIGS. 14A-14B are graphs illustrating examples of channel characteristic sharpening.
Figure 14B:
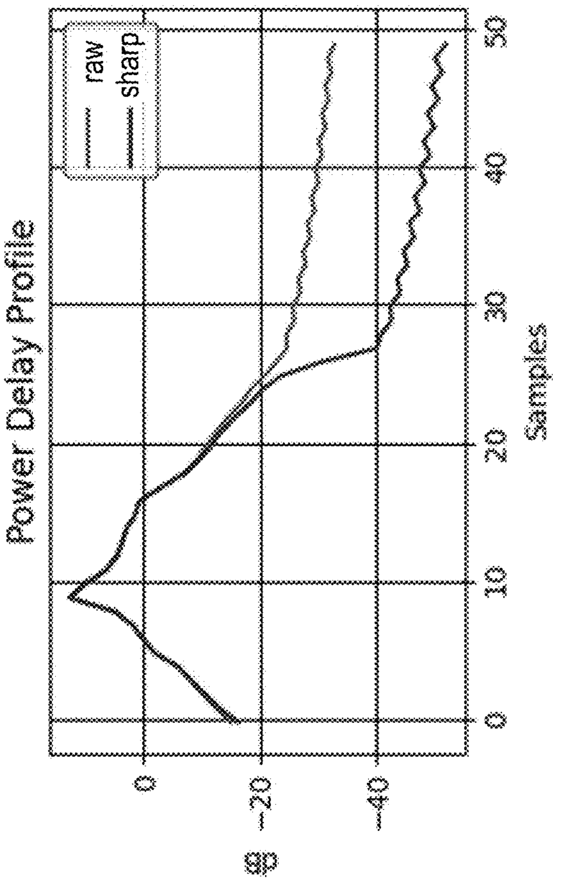

In some implementations, the channel characteristics are sharpened (624) prior to being used for training. When computing channel characteristics (e.g., PDP) from received RF signals in operation 614, various assumptions such as filtering, shaping, band-limits, etc. may affect the computed channel characteristics in the frequency and/or time domains. In some implementations, to mitigate possible mis-estimations due to incorrect assumptions, a machine learning based channel sharpening method may be used in de-convolution, in order to convert best convert estimated CSI, channel response estimates, PDP, etc., into clean de-convolved time-domain impulse responses. An optimization method can be used to improve the channel estimates using multiple received RF signals. For example, a gradient descent process can be performed across various RF signals captured with the same or similar hardware, such that the RF signals may have similar effects convolved onto the channel response. The gradient descent or other optimization can be performed to optimize one or more estimation variables used in operation 614. For example, the optimization can be performed to select a new set of filter taps which, when convolved (or deconvolved), maximizes the sparsity of the channel response samples, while, for example, maximizing peak power, minimizing mean median power and/or normalizing the sum or total power of the RF signals used for the optimization. In some implementations, this can provide a naive, relatively unsupervised, and effective process to obtain PDP (or other channel characteristics) examples which can be used for RF-RF model training, execution, inference, localization, testing, scoring, and/or other purposes with performance better than if the channel characteristics' "unsharpened" equivalents were used. For example, as shown in FIG. 14B, a "raw" estimated PDP significantly understates a level of attenuation compared to a sharpened estimated PDP. As shown in FIG. 14A, a learned filter "window" can be used to deconvolve or sharpen the effects of the receiver on the PDP, where the raw response can convolved with the window provides a sharpened response.

As further shown in FIG. 6, the channel characteristics (e.g., directly from the receiver 602 or retrieved from a remote storage/system) and respective positions $p_{tx}$, $P_{rx}$ of the receiver 602 and transmitter 604 are used to train or retrain an RF-RF model (616). For example, the positions $p_{tx}$, $P_{rx}$ and the determined channel characteristics can be used as training data, with the determined channel characteristics being ground-truth labels for the positions $p_{tx}$, $P_{rx}$. It will be understood that the training data also includes many other sets of training data and labels corresponding to other receiver and/or transmitter positions and corresponding channel characteristics. Accordingly, the RF-RF model is trained to estimate channel characteristics (e.g., channel impulse response, PDP, etc.) for transmission between any two positions in the environment in which the receiver 602 and transmitter 604 are located. For example, the training data may include aggregated examples of $p_{tx}$, $P_{rx}$, and channel characteristics for a RAN sector, for a specific cell, etc. In some implementations, the different $p_{rx}$ include different locations of antenna elements on a single UE or other radio device.

In some implementations, training data for the RF-RF model further includes additional information, such as one or more characteristics of the received signal 606 (e.g., frequency, encoding, modulation, etc.), time of day of reception of the received signal 606, weather/temperature during reception of the received signal 606, an identity of the emitter and/or receiver (e.g., to learn antenna patterns for the emitter and/or receiver), and/or the like. Accordingly, the RF-RF model can be trained to estimate channel characteristics for signals transmitted at particular frequencies, in particular weather contexts, etc.

When the receiver 602 is a mobile device (e.g., a mobile phone, mobile cellular analysis equipment, etc.), the position of the receiver 602 can be provided by the receiver 602 itself (e.g., based on global navigation satellite system (GNSS) localization), and/or the receiver 602 can be localized, e.g., by signal triangulation, angle-of-arrival (AOA) or another suitable method. In some implementations, a mobile device reports its position to the network (e.g., to a base station, such as the transmitter 604) for use in RF-RF model training. The position of the transmitter 604 can be a known parameter, e.g., when the transmitter 604 is a fixed base station.

During training, parameters (such as weights, hyperparameters, coefficients, and/or the like) of the RF-RF model, such as parameters of the MLPs 502, 504 (and including, in some implementations, parameters of a positional embedding module such as learned positioning embedding module 510, parameters of a voxel representation of the environment, etc.) can be adjusted to decrease/minimize a value of a loss function based on differences between (i) outputs of the RF-RF model during training, e.g., outputs obtained according to the process 200 discussed above, where the outputs are obtained using the inputs of the training data, and (ii) the channel characteristics of the training data. That is, the RF-RF model can be trained based on actual RF measurements, e.g., actual measurement data of a channel impulse response or a measured PDP, in comparison to predicted values. When the loss function between estimated values and measured values (e.g., estimated PDPs and measured PDPs) is computed, the estimation is differentiable (e.g., based on the equations provided above in reference to FIG. 2), such that gradients of the loss can be used to update the parameters of the RF-RF model. The RF-RF model can be updated for locations along the direct path LOS (shown in FIG. 3) and along sampled reflected paths, to cause the RF-RF model to represent an accurate parametric machine learning encoding of spatial/volumetric propagation properties of an environment, e.g., a scene or a location.

Model training (operation 616) can be performed using one or more computing devices and/or systems. In some implementations, model training is performed at a base station, e.g., at the transmitter 604. In some implementations, model training is performed at a distributed unit (DU) of a RAN. In some implementations, training data such as aggregated $p_{tx}$, $P_{rx}$, and PDP are sent (e.g., from receiver 602 such as UE, and/or from transmitter 604 such as a base station) to another service/layer such as a base station, a RAN intelligent controller (RIC) xApp, rApp, or other application, a multi-access edge computing (MEC) system, or a cloud computing system, which performs the training. In some implementations, the RIC, MEC system, and/or cloud computing system receives data (e.g., and stores the data) in operation 618 and uses the received data for training. In some implementations, model training is performed at UE.

In some implementations, the RF-RF model is trained (e.g., in operation 616) using regularization. For example, an L1 loss (which may promote sparsity) can be added to a neural network output of absorption or Gaussian splatting output of absorption. This can help the RF-RF model embed, for example, a spatially-sparse representation of an environment in which most of the volume is "free space" with very little absorption. The regularization can help the RF-RF model learn, for example, that absorption should be zero in most locations, jumping to higher values at certain other locations (e.g., walls).

In some implementations, different RF-RF models can be specialized for different situations. An area can be divided into multiple areas modeled by multiple corresponding RF-RF models that will tend to perform better in their area(s). The different RF-RF models can vary from one another in, for example, loss function, spatial resolution, architecture, etc. In some implementations, a classifier can be used to decode which area to route to obtain fine resolution within different subsections of an input.

Referring again to the process 610 of FIG. 6, the trained RF-RF model can be deployed (620), e.g., onto any one or more devices/systems of a radio network, such as in UE, in a base station (e.g., a gNB), in a DU, in a CU, in a RIC application, in an MEC system, in a cloud computing system for the radio network, etc. For example, the weights and other parameters that represent the trained RF-RF model can be stored in one or more of these devices/systems. Once deployed, the trained RF-RF model can be executed (by the device/system on which the trained RF-RF model is deployed) for channel estimation (e.g., as described with respect to FIG. 2) and used for various purposes, e.g., for RF transmission/reception control, RF network design, localization, etc. Examples of utilization of deployed RF-RF models are described below with respect to FIGS. 8-13.

In some implementations, RF-RF model training incorporates an aspect of received-signal directivity. For example, channel estimation in operation 614 can use a direction-of-arrival (DOA) estimate for received signals (e.g., a multiple signal classification (MUSIC) algorithm or a machine learning-based direction-finding algorithm), and the DOA estimates can be included the PDP or other channel characteristic used as training data in operation 616. For example, the PDP can be extended to energy and direction probabilities at each delay within the PDP, and the extended PDP can be used to train RF-RF models and associated processes that consider the angular aspect of each ray or delay when ray-casting within the RF-RF model process with regard to the gain pattern, direction, or distribution of directions based on, for example, angular gain parameters or related probabilistic sampling. This directivity can be useful, for example, when performing localization as discussed with respect to FIG. 12.

Although RF-RF model training can be performed based only on RF captures, in some implementations, a geometry-driven approach that incorporates known mapping data can accelerate model training. For example, training the RF-RF model may be a data-intensive process, sometimes requiring many examples of $p_{tx}$, $P_{rx}$, and PDP to use as training data to train a resilient version of the model and fill in enough detail to generalize well to new locations within the environment. In some implementations, to accelerate training, the RF-RF model can be seeded with prior known information. For example, as shown in FIG. 6, mapping information characterizing the environment can be obtained (650), the mapping information indicating, for example, known geographic features, structures, etc., and their RF properties. The RF-RF model can then be seeded and/or pre-trained based on the mapping information (652). For example, rather than random weight initialization, mapping information such as building locations, known geometries, reflectances, absorptions, and/or transmittances may be used to pre-train or seed the weights of the RF-RF model. For example, absorption may be set to a very low value for areas which are believed to be clear free-space areas volumetrically, while areas having hard construction materials such as concrete, metal, glass, etc. may be given higher absorption values or reflectance values based on estimates such as their material properties, frequency of operation, etc. Even rough estimates for the mapping information can provide a useful starting point for training the RF-RF model, with the expectation that the RF-RF model will be updated and further trained based on real-world RF captures as shown in FIG. 6. For example, the subsequent model training may refine fine-geometry features such as building wall details, as well as surface properties such as absorption and reflectance, which may have been estimated poorly in seeding/pre-training (652) but which can be fit closely to observation-based data during full model training. Even coarse starting data indicating where objects and free space are, and what their potential RF properties are, can, in some implementations, provide a strong initial starting point to reduce data requirements and training time and costs for the RF-RF models described herein. In the case of a Gaussian splatting RF-RF model, initialization can include splats that match or approximately match the locations of buildings and other objects in the environment (e.g., using mapping data) to accelerate training.

Capture of RF data for training/retraining can be performed in an operations-integrated manner (e.g., in which network devices/systems such as UE and base stations capture training data during standard network operation) and/or in special-purpose operations. As an example of the latter, a reference signal receiver can be driven through an environment to capture accurate location and impulse response (PDP) data (from one or multiple emitters), obtaining the received signals and corresponding signals used for training. Other data can be collected and/or determined in conjunction with reception of reference signals, to be used as the "other information" shown in FIG. 6 to train RF-RF models that receive additional inputs for more-contextually-specific channel estimation. For example, telemetry about the location of the receiver can be collected (e.g. GPS coordinates that provide $p_{rx}$ for training data, velocity, heading, timing, precision), and/or other relevant data such as environmental factors, e.g., weather, temperature, humidity, etc. The ground-truth channel estimates can include, for example, received channel state information (CSI) such as frequency-domain channel estimators on OFDM or other basis functions, time-domain channel impulse response estimates, PDP, delay-Doppler spectrum estimates, and/or other representations of the channel response for signals received at the receiver.

As a non-limiting example of training data capture, received RF signals include the N×M multiple-input-multiple-output (MIMO) channel response between (i) an N-element 4G base station transmitting reference tones including primary synchronization channel (PSS) signals, secondary synchronization signals (SSS), and DMRS signals, any or all of which can be used for synchronization and channel estimation, and (ii) an M-element UE or software radio, or other test equipment such as a spectrum analyzer, that can then estimate (or pass data to another device that estimates) the N×M channel responses. In this case, decoding of protocol information such as the PSS, SSS, and/or master information block (MIB) from the reference emitters can help to indicate which emitter is observed. For example, the PSS, SSS, and MIB encode each emitter's physical cell identity (PCI), e.g., a PCI of an emitter cellular tower. The identity can then be cross-referenced with a database to determine the emitter's precise location, providing a value of $p_{tx}$ for training data from other sources such as a database. This method can be used to rapidly compile a rich dataset of channel response vs location ($P_{rx}$) vs emitter ($p_{tx}$) data which captures the channel responses for an environment.

In some cases (for example, prior to deployment of a network in an environment), various reference tone emitters may be placed in the environment, such as special-purpose reference tone emitters. These emitters can be used instead of, or in addition to, base stations to help rapidly generation a propagation model for environment. The emitters can be static (e.g., fixed on buildings or towers), and/or can be dynamic, such as on cars or drones. In some cases emitters can include software radios or test and measurement gear such as vector signal generators.

Figure 7:
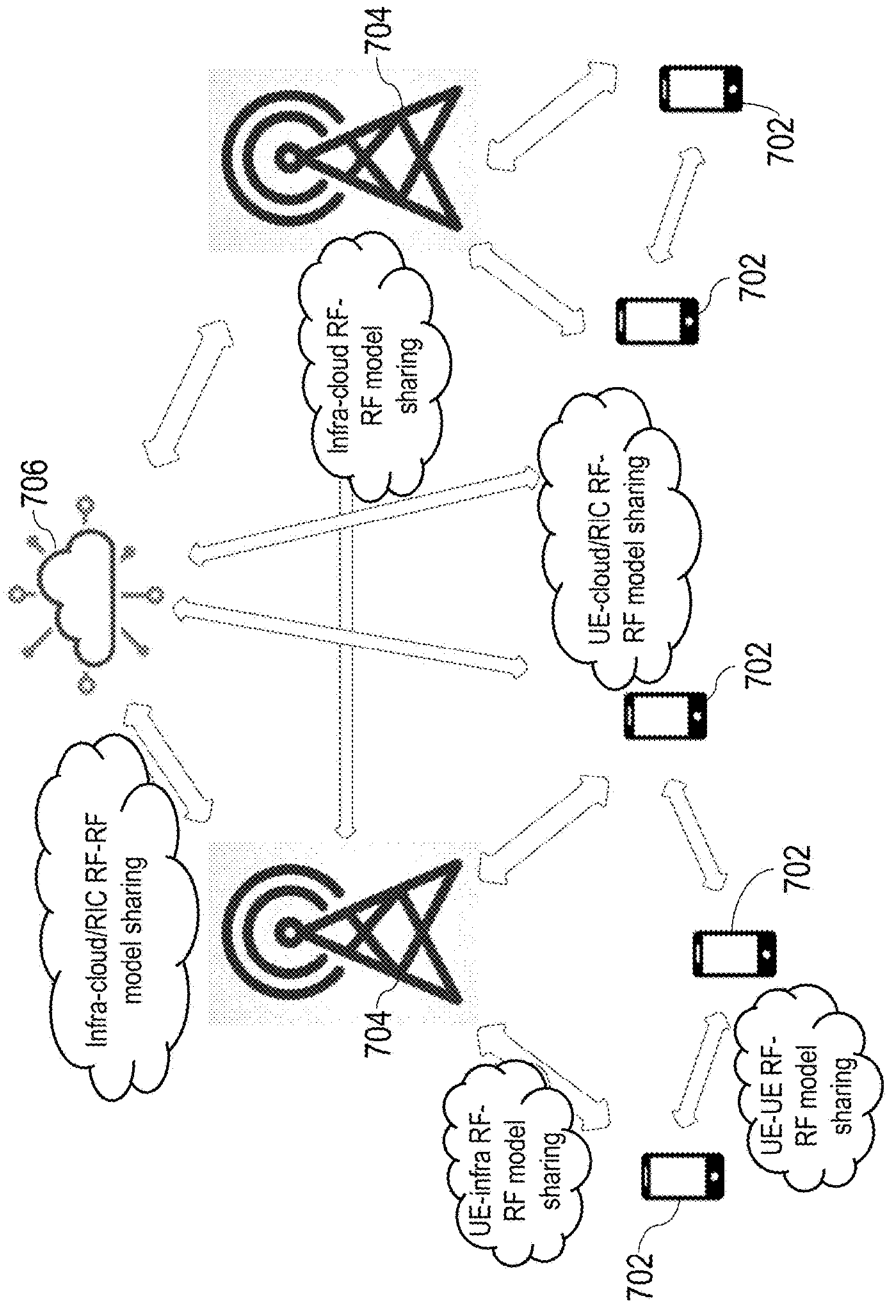
FIG. 7 is a diagram illustrating an example of a communication system with RF-RF model sharing.

In some implementations, model training and/or retraining is performed in a distributed and/or shared manner. For example, FIG. 7 illustrates a communication system 700, e.g., devices and systems of a cellular network in an environment, with RF-RF model sharing. The system 700 includes UE 702, network infrastructure systems 704 (e.g., base stations, eNBs, gNBs, DUs, MECs, RICs, xApps, rApps, etc.), and a cloud computing system 706, some or all of which are communicatively coupled to one another through one or more wired and/or wireless connections. RF-RF models are deployed on the UE 702, infrastructure systems 704, and cloud computing system 706, where the RF-RF models need not be identical to one another. For example, each infrastructure system 704 can store an RF-RF model for the vicinity/cell of the infrastructure system 704, while the cloud computing system 706 can store a larger model representing a larger region, e.g., the cells of all of the infrastructure systems 704. As discussed below with respect to FIGS. 8-13, the UE 702, infrastructure systems 704, and/or cloud computing system 706 can use the RF-RF models to make various decisions, such as such as which sector to roam onto (e.g., making the determination pre-emptively), which power levels and/or beam configurations are most appropriate, how and when to rendezvous with other network elements, etc.

Entire or partial RF-RF models (e.g., parameters that define the RF-RF models, such as weights), and/or training data for training/retraining RF-RF models, can be transferred between system components. For example, weights, parameters, etc., and/or observation data such as $p_{rx}$ and $p_{tx}$ values alongside corresponding channel characteristics (e.g., PDP measurements) can be shared. For example, as shown in FIG. 7, weights, observations, measurements, models, etc. can be transmitted between UE 702, between UE 702 and infrastructure systems 704, between infrastructure systems 704, between infrastructure systems 704 and the cloud computing system 706, and/or between the cloud computing system 706 and UE 702. For example, the weights can be encoded into various protocol messages, such as ASNI, JSON, BSON, IP messages, binary data, and/or other protocol messages for transmission. The weights can be used by receiving devices/systems to update their local models, and/or the measurements can be used by receiving devices/systems to retrain their local models.

In this way, models can jointly optimize and/or share and utilize accurate RF-RF models collaboratively for network optimization. For example, the UE in an environment can collectively provide an enormous amount of training data to improve model accuracy and completeness, e.g., to accurately embed RF characteristics throughout an environment. Many UEs are expected to travel through an environment along many paths, such that sourcing data from many UEs (the UEs acting approximately as random sampling agents) allows RF-RF models to be quickly trained and built. Moreover, training RF-RF models using signals already present in an environment (e.g., reference signals sent by base stations) can facilitate convenient and rapidly-scaling model generation.

Moreover, in some instances, model training can be distributed. For example, a UE 702 can retrain an RF-RF model deployed on the UE 702 based on RF observations/measurements by the UE 702. The UE 702 can determine its own position (e.g., $p_{rx}$) based on GNSS data or other on-device localization, and can determine the other location for training (e.g., $p_{tx}$ of a base station) using a location database or other method. One or more resulting updates to the RF-RF model (e.g., model weights and/or weight update gradients) can then be transmitted to one or more other devices/systems, such as another UE 702, an infrastructure system 704, and/or a cloud computing system 706, so that the receiving devices/systems can update their local RF-RF model(s) based on the provided updates. A suitable scheme, such as a central orchestration server and/or federated learning updates, can be used to cause all the models to attempt to converge to one "distributed" shared solution. In some implementations, the updates are sent without sending the underlying training data (e.g., $p_{tx}$, $P_{rx}$, and/or measured PDP), preserving privacy while still allowing distributed RF-RF models to be improved. Moreover, these methods of distributed training can reduce the processing load and/or power consumption for any one computing device/system. With distributed training, RF-RF models can rapidly converge through collaboration by many network elements. In some implementations, distributed training is performed in a "device-side-only" manner, e.g., without requiring infrastructure-side training.

Some implementations of distributed training data collection and/or distributed training/retraining can provide reduced power consumption, allowing RF-RF models to rapidly converge through collaboration by many network elements. Moreover, standardized RF-RF models for an environment can be trained based on data from many devices in the environment, e.g., standard models for metropolitan environments such as a "New York RF-RF model," a "Chicago RF-RF model," etc. As such, trained RF-RF models can be used for functions for which other models such as tapped delay line (TDL)-A, TDL-B, clustered delay line (CDL)-A, CDL-B, etc., models are conventionally used, e.g., for standard radio conformance testing (RCT) tests. For example, specific sets of RF-RF models or RF-RF model parameters, or locations, ray-tracing paths, events, etc. defined through such models, can be used as test cases, training cases, validation cases, etc. In this way, wireless performance measurement and validation may be made realistic, e.g., using a realistic and standardized test cases for development and certification, based on the RF measurement-based RF-RF models.

In some implementations, a mobile UE 702 (or another mobile device/system, e.g., a vehicle) can load RF-RF models on an as-needed basis. For example, based on being in a first region or cell, the UE 702 can load (e.g., download from a remote computer system over a network) a first RF-RF model that represents the RF characteristics of the first region or cell, e.g., that was trained using training data collected in the first region or cell. In response to moving to a second region or cell, the UE 702 can load a second RF-RF model that represents the RF characteristics of the second region or cell. Moreover, in some implementations, in response to leaving the first region or cell, the UE 702 can unload (e.g., delete from local storage) the first RF-RF model. Accordingly, the UE 702 can consistently access accurate models while conserving local storage space.

In some implementations, distributed training can be performed using multiple distributed transmitters (emitters). For example, in many cases, multiple base stations (e.g., cellular towers) emitting in the same band exist in the same environment. In addition, different base stations may each use the same center frequency, but with different sets of preamble or reference tones. In addition, multiple frequency bands may be utilized with various different $p_{tx}$ and $p_{rx}$ locations, for example, on bands licensed to different users, or based on different technologies such as cellular, GMR, Wi-Fi, WPAN, Internet of Things (IoT), broadcast radio, etc. Signals from these multiple emitters can be received, processed to determine channel characteristics, and used to train RF-RF model(s), for example, frequency-dependent models that receive signal frequency (or an embedded version thereof) as an input, so as to provide frequency-dependent outputs, e.g., frequency dependent absorption and reflection. Moreover, using RF-RF models trained from data from multiple emitters, in some implementations, the channel characteristics for a potential new emitter in the environment can be modeled, e.g., to guide deployment of the new emitter as discussed with respect to FIG. 11. In addition, the use of training data from multiple emitters can increase the amount of available training data, resulting in faster convergence during model training and/or more-accurate trained model.

Moreover, in some implementations, the multiple emitters can at least partially correspond to different RF-RF models (e.g., local models) that can be trained at least partially together. For example, different emitters may use different frequencies, may use different transmission channels, may correspond to different antennas, may be located in multiple locations, etc., while serving overlapping or common spatial areas within the world. In such cases, there may some common information between RF-RF models trained for each emitters. For example, reflectors (solid objects) are likely to have the same locations for each RF-RF model, even if the models are trained to make predictions for different RF frequencies. Accordingly, there can be a benefit in training joint models, which can be illuminated from different angles/locations, and/or can have similar (but not necessarily identical) frequency regions. For example, the training data used in operation 616 can include training data obtained by processing RF emissions from multiple emitters having different locations, serving at least partially different cells, serving at least partially different geographic regions, emitting at different frequencies and/or frequency ranges, emitting using different modulation schemes, emitting different signal types, and/or the like. For example, the emitters can correspond to different network types such as 3G, 4G, 5G, 6G, Wi-Fi, IoT, etc.; different sectors; and/or different operators. However, measured impulse responses can be used to train RF-RF models in the shared volumetric space between these various different emitters. For example, absorption values are likely to be similar for similar frequencies, and the same physical features (e.g., walls) will be regressed within the RF-RF representation of propagation from the multiple different emitters. An MPL, Gaussian splatting data structure, or other RF-RF model trained for multiple emitters (e.g., having different frequencies) can exploit the shared information between the different emitters/frequencies (e.g., shared wall locations). Moreover, even when properties vary for different frequencies (e.g., frequency-dependent absorption), the change is often smooth, e.g., such that similar frequencies have similar corresponding absorptions. Accordingly, the smooth function is conducive to being learned by (embedded in) an RF-RF model, and the RF-RF model can be accurately trained on more data (e.g., from more emitting cellular towers), resulting in faster training and/or training with less data collection.

The training data can be used to train a joint model for at least some of the multiple emitters, and/or can be used to train different models for different emitters and/or different regions/environments. Joint training can exploit the common or similar propagation data/PDPs/locations between multiple base stations/sectors/emitters/etc., to build a model covering multiple regions/cells, e.g., a global model.

In some implementations, the RF-RF model training (e.g., operation 616) incorporates a model-scaling/shifting approach to obtain region-specific models. For example, culling on range or another metric (e.g., obstructions) can manage complexity in working with a global model. For example, a technique analogous to grid-NeRF can be applied. In some implementations, this optimization can be performed on a base station, in a DU or CU, in a RIC App such as an xApp, dApp, rApp, zApp, or within another cloud service or process within a network. Accordingly, an "RF Digital Twin" model for propagation within a service area can be built.

The RF-RF model (e.g., trained as described for operation 616) can be a global illumination model (sometimes referred to as a static or fixed illumination model) or a relightable model. These model types differ in how their RF illumination (emission) is encoded. A global illumination model is based on fixed RF emitter locations, intensities, beam patterns, etc., whereas a relightable model permits new or changing emitter locations, RF emission patterns, etc., to predict corresponding channel characteristics such as coverage/propagation properties and received at new candidate receiver locations under the new illumination. For example, a Gaussian splatting RF-RF model trained for global illumination can encode a specific angle of departure and intensity for each of one or more "channels" (fixed emitters, frequencies, or both, and/or another parameter) in an environment, from each splat (e.g., encoding, for each splat, the output "final ray" of any reflections in the environment). A Gaussian splatting RF-RF model trained as a relightable model can encode a function that maps angle of arrival to angle of departure, and reflected intensity, for each splat. In some implementations, a relightable model can be fit from a global illumination model or multiple global illumination models (e.g., corresponding to different emitters and/or bands/frequencies.

In some implementations, the model training process 600 includes a bootstrapping process in which a global illumination model is first trained, and then a relightable model is trained based on the global illumination model (654). For example, the relightable model can be trained from the global illumination model based on secondary rays traced back to illumination sources (e.g., using existing surface properties of the global illumination model) and/or by performing retraining using last-hop ray assumptions, in order to learn $2^{nd}$, $3^{rd}$, and/or $n^{th}$-hop rays, splat properties, etc. for the relightable model.

RF-RF Model Utilization

Trained, deployed RF-RF models can be used for various purposes, e.g., to control RF signal transmission and/or reception, to configure network deployments, for localization, for propagation prediction, and for other purposes. The control and configuration can be based on RF signal propagation simulations performed using the RF-RF models, e.g., to simulate propagation between arbitrary $p_{tx}$ and $p_{rx}$ in an environment, for uplink and/or downlink signals.

Figure 8:
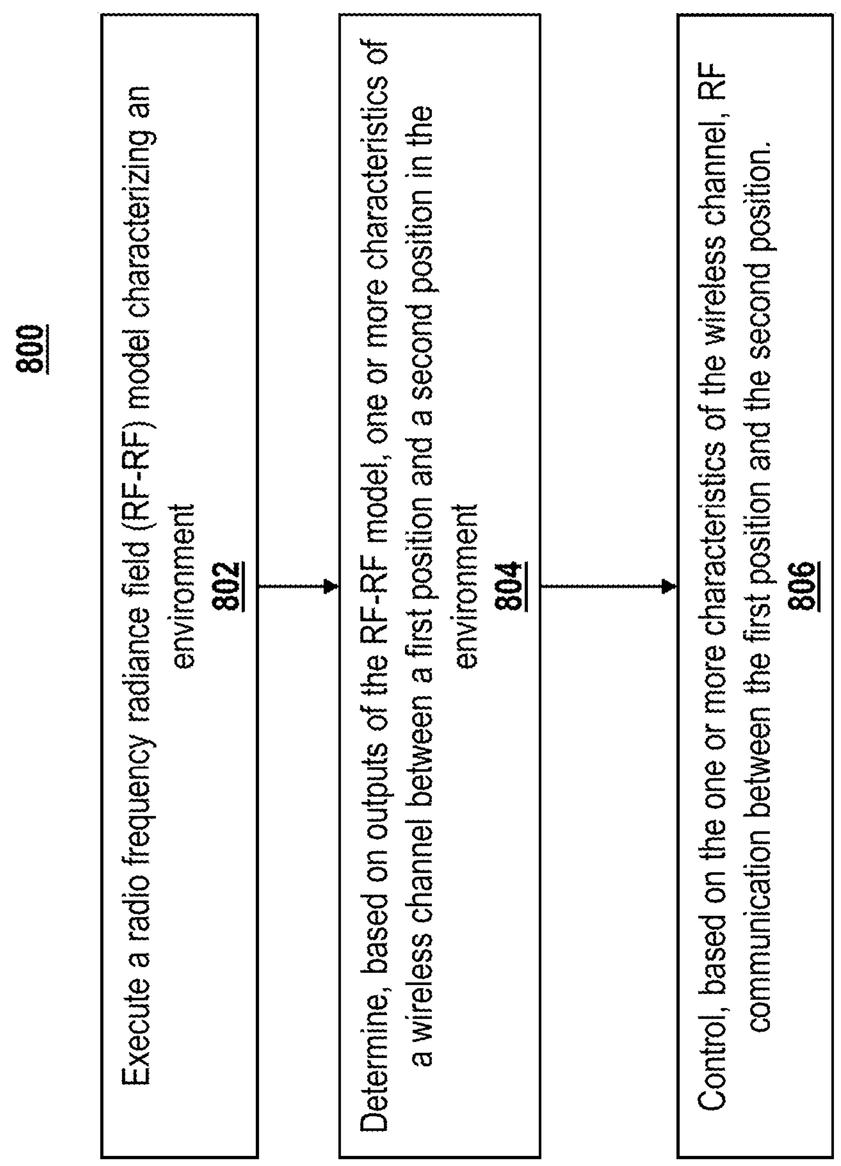
FIG. 8 is a diagram illustrating an example of an RF control process.

FIG. 8 illustrates an example of a process 800 for RF transmission and/or reception control. The process 800 can be performed by one or more computing systems and/or devices, e.g., by one or more UE, one or more infrastructure systems (e.g., DU, RIC application, RU, CU, etc.), and/or one or more remote computing systems (e.g., a cloud computing service), alone or in combination. For example, the process 800 can be performed by any or more of the aforementioned systems and/or devices in communication systems 100, 600, and/or 700, and the RF-RF model and use of the RF-RF model in the process 800 can correspond to any of the RF-RF models discussed in the previous sections, such as the process 200 and RF-RF model 500, without being limited to the specific architecture shown for RF-RF model 500.

The process 800 includes executing an RF-RF model characterizing an environment (802). For example, the RF-RF model can be a neural RF-RF model including one or more MPLs, a Gaussian splat-based radiance field model, an "instant" RF-RF model incorporating a learned multiresolution hash encoder, etc. The RF-RF model can be executed as described in reference to FIGS. 2-3, e.g., by providing, as inputs to the RF-RF model, positions in the environment, and obtaining, as outputs of the RF-RF model, corresponding parameters such as absorption, transmission, reflection, etc. For example, executing the RF-RF model can include providing, as input to the RF-RF model, positions along a ray in the environment and, in some implementations, additional information such as RF signal frequency, weather information, time, etc., and obtaining, as output of the RF-RF model, absorptions and reflections corresponding to the positions or the ray.

The process 800 further includes determining, based on outputs of the RF-RF model, one or more characteristics of a wireless channel between a first position and a second position in the environment (804). For example, the first position and the second position can be positions between which rays are traced, and positions on the rays can be provided as input to the RF-RF model in operation 802. Determining the one or more characteristics of the wireless channel can be performed as described in reference to FIG. 2, e.g., operations 210 and 212 of FIG. 2. For example, the one or more characteristics can include a PDP, impulse response, transmitted energy for the wireless channel, and/or other CSI for transmission between the first position and the second position, and the characteristics can be determined by computing time-of-arrival-dependent rendering functions based on transmitted power levels for rays traced through the environment based on RF-RF outputs. In some implementations, as discussed below in reference to FIGS. 9-10, the one or more characteristics include key performance indicators (KPI) that characterize a quality of the wireless transmission. KPIs can be determined, for example, based on PDPs determined based on the model outputs, and/or based on the model outputs without intermediate computation of PDPs. Whereas visual NeRF predicts an image of a scene from a previously-uncaptured perspective, RF-RF model-based processes according to this disclosure can predict channel characteristics for signal scenarios not previously recorded (e.g., for different $P_{rx}$ and/or $p_{tx}$, for a different frequency, for different modulation, for different time/weather, for different beam pattern, etc.).

The process 800 further includes controlling, based on the one or more characteristics of the wireless channel, RF transmission between the first position and the second position (806). Controlling the transmission can include controlling scheduling, beamforming, modulation, pairing, resource allocation, etc., as discussed below in reference to specific examples. For example, optimized parameters can be selected from a set of candidate parameters based on the channel characteristics, and one or more RF devices (e.g., UE, network infrastructure systems, etc.) can be controlled to conform to the optimized parameters, e.g., as discussed below in reference to FIGS. 9-10.

In some implementations, controlling the RF transmission (806) including controlling at least one of a receiving device or a transmitting device in accordance with selected communication parameters, e.g., the communication parameters selected in process 1000, discussed below. For example, an RU or UE can be controlled (e.g., by a computing device of the RU or UE, and/or by one or more signals sent to the RU by a RIC application, the DU, a cloud service, or the CU) so that the RU or UE (e.g., using an antenna of the RU/UE, beamforming circuitry of the RU/UE, and/or signal processing circuitry of the RU/UE) transmits and/or receives RF signals that conform to selected scheduling, selected beamforming/beam-tuning, a selected emission power level, a selected frequency, a selected modulation, a selected pairing, a selected resource allocation, a selected spatial mode, and/or the like. For example, in some implementations, process 800 is performed by a system remote from or separate from the RU or UE (e.g., the DU, a RIC application, a cloud service, and/or the CU), and operation 806 is performed by sending signals to the RU or UE that control the RU or UE. In some implementations, process 800 is performed by the RU or UE itself, and the RU or UE controls its own transmission and/or reception based on the determined characteristics of the wireless channel.

Figure 9:
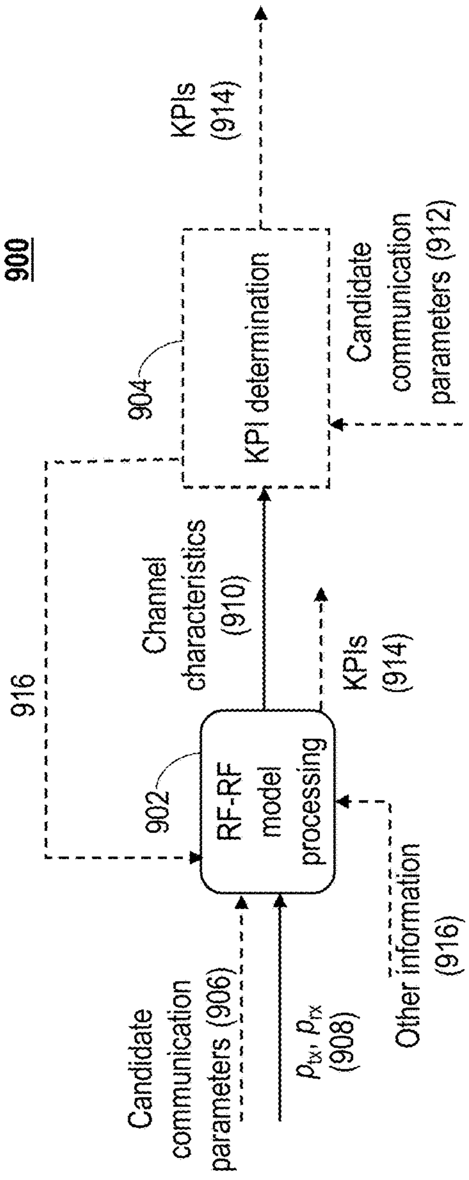
FIG. 9 is a diagram illustrating an example of data flow associated with a process utilizing an RF-RF model.
Figure 10:
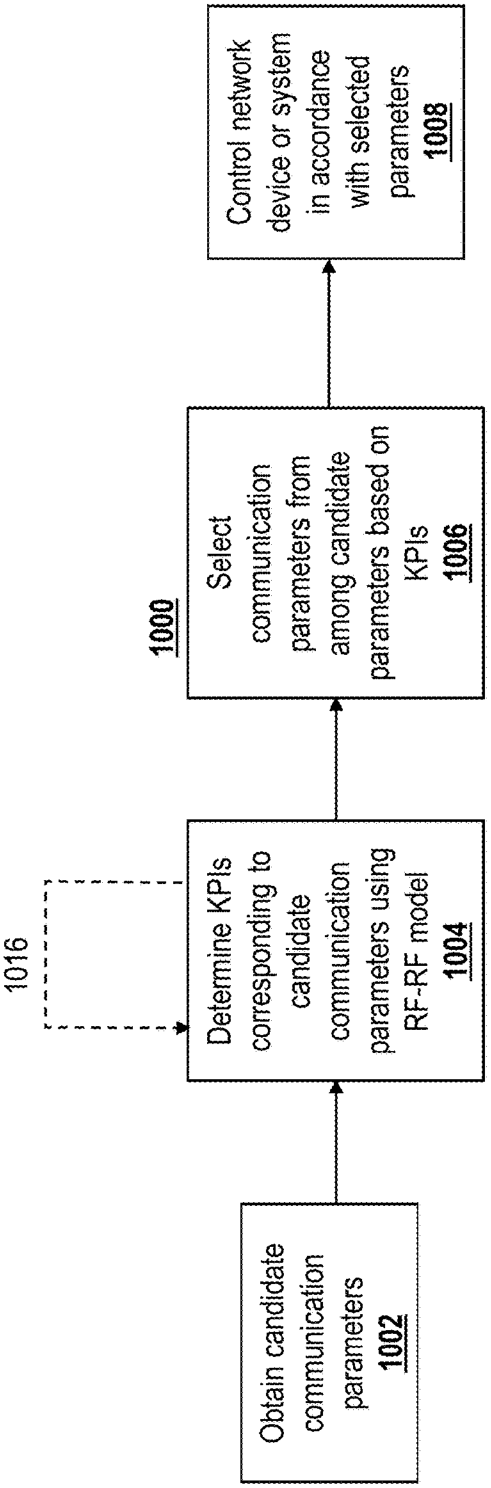
FIG. 10 is a diagram illustrating an example of a parameter selection processor for an RF control process.

FIG. 10 illustrates an example of a process 1000 for parameter selection associated with the process 800, and FIG. 9 illustrates an example of data flow associated with the process 1000. Process 1000 can be performed by one or more computing systems and/or devices, e.g., by one or more UE, one or more infrastructure systems (e.g., DU, RIC application, RU, CU, etc.), and/or one or more remote computing systems (e.g., a cloud computing service), alone or in combination. For example, when determining parameters for transmission to UE, process 1000 can be performed by a network-side component such as a DU, RIC application, RU, CU, etc. When determining parameters for transmission to a network-side component, process 1000 can be performed by a computing device of UE, e.g., a computing device of a mobile phone (or, in some implementations, by a network-side component that provides the selected parameters to the UE). For example, the process 1000 can be performed by any or more of the aforementioned systems and/or devices in communication systems 100, 600, and/or 700, and the RF-RF model and use of the RF-RF model in the process 1000 can correspond to any of the RF-RF models discussed in the previous sections, such as the process 200 and RF-RF model 500, without being limited to the specific architecture shown for RF-RF model 500. In some implementations, process 1000 can be performed by any suitable computing device or computing system.

Process 1000 generally relates to utilizing RF-RF models to optimize spatial-spectral wireless access strategies. Trained, highly-accurate propagation models (RF-RF models) can be used to optimize the function of a RAN itself. To this end, various RAN functions such as modulation, beamforming, user scheduling and user pairing for MIMO, resource allocation, etc., may benefit from being able to very accurately predict the propagation and expected PDP for each transmission mode. The process 1000 can also be applied outside the RAN context for any type of wireless RF-based communication.

For example, as shown in FIG. 10, process 1000 includes obtaining candidate communication parameters (1002), e.g., for communication between a transmitter having position $p_{tx}$ and a receiver having position $p_{rx}$. The communication parameters are parameters that define RF signal transmission and/or reception. As non-limiting examples, the communication parameters can include: scheduling (e.g., which users/UEs to co-schedule, which users/UEs to schedule at which times, etc.); pairing (e.g., which users/UEs to pair with one another); resource allocation (e.g., time and frequency resource allocation); modulation scheme; beam alignment; power control; interference management; spectrum coordination; MIMO mode selection; MIMO precoding; rate selection; Quality of Service (QOS) selection; higher-level application adaption (e.g., audio bitrate and/or video bitrate); and/or beam pattern (e.g., beamforming weights for an RF signal from UE to a base station or from a base station to UE). A set of candidate communication parameters can include multiple of each of one or more of these and/or other communication parameters, for example, multiple alternative sets of beamforming weights to use, multiple alternative co-scheduling configurations for a base station, etc. The candidate communication parameters can be obtained according to any suitable optimization scheme, e.g., randomly selected, selected at regular intervals within a range, selected in an iterative process based on the values of KPIs determined in operation 1004, and/or the like.

Using an RF-RF model, corresponding KPIs are determined for each of the candidate communication parameters (1004). The KPIs are estimates/predictions of results of transmission and/or reception using the candidate communication parameters, as determined using one or more RF-RF models. Examples of KPIs include signal-to-noise ratio (SNR), signal-to-interference-plus-noise ratio (SINR), a measure of throughput, a measure of latency, error rate (e.g., bit error rate (BER) or block error ratio (BLER)), received signal power/strength (e.g., reference signal received power (RSRP)), channel quality indicator, spectral efficiency, sum-rate, and/or the like.

An example of a process 900 of KPI determination (1004) is shown in FIG. 9. Inputs are provided to an RF-RF model (in an RF-RF model process 902) to determine channel characteristics 910. The inputs can include simulated transmitter and receiver positions $p_{tx}$, $P_{rx}$ (908). For example, process 1000 can be performed by a base station to optimize transmission to UE, in which case $p_{tx}$ can be the position of the base station and $p_{rx}$ can be the (current or predicted) position of the UE. In some implementations, the inputs include other information 916, e.g., contextual/supplementary information such as RF signal frequency, weather information, temporal information, etc., as described for the "other information" of FIG. 6.

In some implementations, the inputs to the RF-RF model processing 902 include one or more of the candidate communication parameters themselves (906), e.g., so that outputs of the RF-RF model process 902 can depend on candidate scheduling, resource allocation, etc. In that case, the RF-RF model can have been trained based on training data including communication parameters (so as to accept the communication parameters as model inputs), and/or the communication parameters can be included in the RF-RF model process 902 when outputs of the RF-RF model are being utilized, e.g., in operations 210 and/or 212 of FIG. 2. For example, because different beamforming weights (an example of a possible communication parameter) can result in different spatial beam emission profiles that correspond to different PDPs (e.g., corresponding to different sets of weights assigned to different RF-RF-model-calculated rays in ray integration/summation), in some implementations the RF signal propagation simulation of the RF-RF model processing 902 can take the beamforming weights into account (e.g., as an input to the RF-RF model or as part of post-processing, such as during ray summation/integration in operation 212). Other communication parameters can instead or additionally be included as inputs to the RF-RF model processing 902.

The RF-RF model processing 902 can include the processing discussed above in reference to FIGS. 2-3, 5, and 8, e.g., tracing rays in the environment using the RF-RF model to simulate RF signal propagation and determine transmitted power and/or other signal propagation characteristics, such as PDP.

Outputs of the RF-RF model processing 902 include channel characteristics 910. In some implementations, the channel characteristics include PDP, impulse response information, etc. In some implementations, the output channel characteristics include one or more of the KPIs (914). For example, ray-tracing simulations using the RF-RF model can provide, as an output, a signal power for transmission from $p_{tx}$ to $p_{rx}$, and the signal power can be a KPI.

In some implementations, the channel characteristics 910 are used to determine one or more KPIs (904). KPI determination (904) can be (but need not be) based on one or more of the candidate communication parameters (912). For example, given a PDP estimated using the RF-RF model, then different beamforming weights, different scheduling, different resource allocation, etc., can result in different KPIs corresponding to the different candidate communication parameters. Alternatively, or in addition, the candidate communication parameters can be taken into account during RF-RF model processing (902).

As an example of KPI determination, a base station evaluates two possible candidate co-scheduling configurations for transmission to two UE. For each co-scheduling configuration, the base station traces rays from the base station to the two UEs and uses an RF-RF model to determine PDPs (an example of channel characteristics 910) for transmission from the base station to each of the two UE. The base station uses the PDPs to determine, for each co-scheduling configuration, (i) signal strength and/or signal timing received at the two UEs from signals assigned to the two UEs and (ii) signal strength and/or signal timing received at the two UEs from signals assigned to the other of the two UEs (e.g., representing interference). The strength and/or timing, and/or a measure derived therefrom (e.g., SINR), are KPIs.

Selected communication parameters are determined based on the KPIs (1006). For example, a set of candidate communication parameters providing the best KPI(s) among the candidate communication parameters can be selected. In some implementations, the processes 900/1000 includes iteration/feedback (916, 1016), e.g., in which candidate communication parameters are iteratively selected for evaluation based on KPIs computed for previous candidate communication parameters. Because the RF-RF model and subsequent processing on model outputs are differentiable, the communication parameters can be optimized directly in an end-to-end fashion to optimize corresponding KPIs, e.g., to maximize SINR for a specific user, minimize power incident on other users, maximize a sum, mean, or minimum of SINRs for multiple beams, or some other such similar optimization. Any suitable optimization method can be used, e.g., a gradient descent method. In reference to the co-scheduling example discussed above, based on the determined KPI(s), the base station can either (i) select the candidate co-scheduling configuration providing the best KPI, from among the two candidate co-scheduling configurations or (ii) iterate further, testing one or more further co-scheduling configurations, to eventually arrive at a selected co-scheduling configuration.

In some implementations, a network device or system is controlled in accordance with the selected parameters (1008), e.g., to have the selected parameters or to transmit and/or receive RF signal(s) using the selected parameters, e.g., as described with respect to the operation 806 discussed above.

Using the RF-RF model for simulation (for instance, of the paths between different user locations $p_{rx}$ and a base station $p_{tx}$) can, in some implementations, allow for very accurate measurement of interference, and allow for high quality selection of, for example, which users to co-schedule to reduce interference. A base station, or a corresponding app such as a RIC rApp, can search or enumerate multiple candidate scheduling possibilities for UEs and corresponding $p_{rx}$ values, and, using an RF-RF model, derive a more-optimal schedule or user pairing strategy for a base station to help maximize the spectral efficiency and sum-rate of a multi-user (MU)-MIMO system. Similarly, beam patterns may be optimized based directly on RF-RF model embeddings of an environment, for instance, by considering (as candidate communication parameters) different beam patterns for transmission from $p_{tx}$ and how the beam patterns' propagation affects (as examples of KPIs) coverage, capacity, interference, sum-rate, energy efficiency, etc. In some implementations, as candidate communication parameters, multiple $p_{tx}$ values and/or $p_{rx}$ values can be considered to evaluate the impacts of different MIMO beam pattern syntheses for transmit and/or receive beams. In some implementations, the modulation scheme (as a candidate communication parameter) may be optimized, e.g., based on a particular network link and PDP or PDP distribution expected for a transmission path within an environment. Techniques such as channel autoencoders and/or AI-Native Air Interfaces may be used to learn new modulation or encoding schemes to optimize for capacity, energy efficiency, latency, or other methods using the accurate simulations provided by the RF-RF model-derived PDP distributions.

In some implementations, controlling RF communication (806) includes controlling handover. Handover can be controlled by executing a trained RF-RF model to model RF signal propagation from multiple emitters (e.g., cellular towers/base stations). Based on the outputs of the model, it can be predicted when a UE will transition out of a sector into another sector in a handover process, or lose coverage such that another frequency band or service should be used in a handover process. In some implementations, the predicted transition/handover can be based on the current velocity of the UE and/or a predicted path of the UE. In some implementations, the outputs of the model can be used to determine how the handover should be performed, e.g., to which sector, band, and/or service UE communication should be handed over. Accordingly, the handover process can be anticipated ahead of time to facilitate faster handover, more efficient handover, better power control based on predicted handover, etc.

RF-RF Model Utilization for Scheduling

Several specific processes of scheduling optimization using RF-RF models are now described. These processes are examples of the optimization and control processes discussed with respect to FIGS. 8-10.

In some implementations, RF-RF models can be used for scheduling or other configuration of multi-user (MU)-MIMO. Desired MU-MIMO scheduling selects, for co-scheduling, users/UE that are maximally orthogonal to each other to maximize capacity, and chooses transmission modes which will maximize performance. MU-MIMO can use channel and propagation data in order to most effectively form beams of spatial modes to each user. Often this is done with outdated channel information, or with simple channel inversion via zero forcing (ZF)/minimum mean squared error (MMSE)-type beam formers. The more-accurate RF-RF signal propagation models discussed herein can allow for more-efficient decision making with regards to MU-spectral efficiency. For example, better knowledge of how each spatial mode will propagate to other UE and sector locations allows for much better scheduling and beam forming to make use of and share spectrum efficiently. Accordingly, in some implementations, processes 800, 900, 1000 can be performed by a network-side component such as a base station, RU, DU, and/or corresponding services, such as RIC applications, to optimize communication parameters such as MU-MIMO schedules, MU-MIMO priorities, beam patterns, beam power levels, precoding weights, and/or other MU-MIMO parameters. In such implementations, the KPIs can include MU-MIMO-relevant KPIs. For example, the KPIs 914 can include a sum-rate of users in a service region, and optimization can be performed to maximize the sum-rate. Network components can be controlled in accordance with the optimized communication parameters (1008) and use the optimized communication parameters to transmit multiple RF signals to multiple users/UE in MU-MIMO deployments.

In some implementations, RF-RF models can be used for scheduling or other configuration in adjacent sectors/cells. Adjacent-cell interference may degrade edge performance, for example, resulting in higher interference levels due to adjacent-sector interference/emissions. Through use of the RF-RF models discussed herein, network-side components may in some cases schedule emissions to be more cognizant of the effects of their emissions on other sectors. For example, processes 800, 900, 1000 can be performed to optimize any of the communication parameters discussed herein, and the KPIs 914 can include a level of interference in an adjacent sector or cell, e.g., as determined by using an RF-RF model to simulate beam propagation from the current sector or cell to the adjacent sector or cell. The RF-RF model can encode signal characteristics of both the emitting sector or cell and the adjacent sector or cell. Optimization can be performed to minimize the level of interference in the adjacent sector or cell. Communication parameters that may be particularly relevant for reducing this interference include scheduling configurations, beam-tuning (e.g., beam patterns, such as beam patterns determined by beamforming weights), and spatial mode. Network components can be controlled in accordance with the optimized communication parameters (1008) and use the optimized communication parameters to transmit RF signals in sectors or cells having adjacent sectors or cells.

In some implementations, RF-RF models can be used for scheduling in the context of a spectrum sharing service such as the Spectrum Access Service (SAS). The CBRS band provides a model for how spectrum may be shared between primary licensed users (having a Priority Access License (PAL)), as well as federal users and general access users (having General Authorized Access (GAA)), such that each may use the spectrum to the maximum extent possible without causing interference or degradation to one another, and with the correct order of priorities. To facilitate this, CBRS currently uses the SAS to distribute spectrum licenses through a process that takes into account emitter locations, bands, power levels, and rights, periodically updating the SAS based on new information, requests, grants, changes, activity, etc. An important part of license distribution is computing how one emitter might interfere with another, for example, how a given emission power and beam propagation from one base station or sector might radiate to users in another sector or coverage area and cause signal degradation. In this regard, the RF-RF models discussed herein can provide more-accurate predictions than, for example, the HAAT models that are often used. For example, processes 800, 900, 1000 can be performed to optimize a spectrum allocation (e.g., which users are assigned to which RF bands), and the KPIs 914 can include a level of utilization in one or more regions and/or a predicted level of interference between users based on the allocation. In some implementations, the use of RF-RF models can provide better SAS performance and better use/re-use of spectrum, compared to the use of other models. For example, the use of RF-RF models can provide improved spectrum sharing between different users, and better packing and overall spectrum efficiency, maximizing the value of finite shared spectrum resources.

RF-RF Model Utilization for Deployment

In some implementations, RF-RF models can be utilized to determine a network deployment configuration, for example, prior to network deployment or when reconfiguring an already-deployed network.

Figure 11:
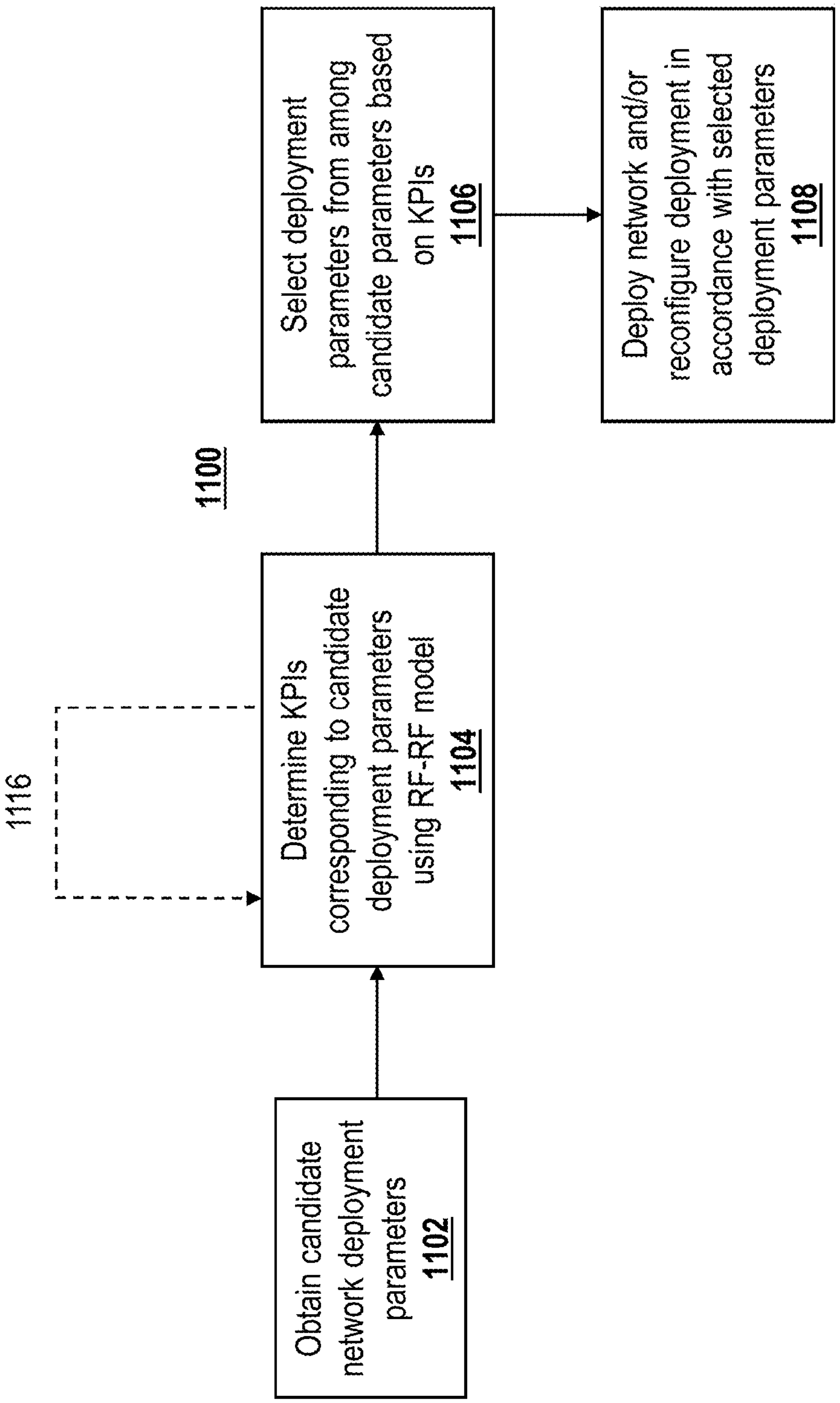
FIG. 11 is a diagram illustrating an example of an RF network deployment process.

FIG. 11 illustrate an example of a process 1100 for determining configurations of network deployment. Operations of process 1100 can be performed as described for process 1000 (except where noted otherwise), with the difference that process 1100 relates to network deployment parameters as opposed to communication parameters. Examples of network deployment parameters include, for example, emitter locations (e.g., cellular tower/base station locations), a number of emitters, spectrum usage/frequency to use for communication (e.g., shared spectrum configuration), transmission gains, antenna patterns, antenna tilts, antenna heights, antenna rotations, etc., which may be updated less-often or less-easily than communication parameters. For example, in some implementations, communication parameters can be understood as relating to a specific communication or communication session with one or more UE, whereas network deployment parameters describe features of a network deployment without relating specifically to a particular session or communication. Some parameters, such as transmission frequency, transmission gain, and antenna parameters (in the context of reconfigurable antennas) can be both communication parameters and deployment parameters.

Process 1100 can be performed by one or more computing systems and/or devices, e.g., by one or more UE, one or more infrastructure systems (e.g., DU, RIC application, RU, CU, etc.), and/or one or more remote computing systems (e.g., a cloud computing service), alone or in combination. In some implementations, process 1100 can be performed by any computing device or computing system. For example, process 1100 can be performed by a user device associated with network deployment. For example, the process 1100 can be performed by any or more of the aforementioned systems and/or devices in communication systems 100, 600, and/or 700, and the RF-RF model and use of the RF-RF model in the process 1100 can correspond to any of the RF-RF models discussed in the previous sections, such as the process 200 and RF-RF model 500, without being limited to the specific architecture shown for RF-RF model 500.

As shown in FIG. 11, the process 1100 includes obtaining candidate network deployment parameters (1102). For example, the candidate network deployment parameters can include a set of possible positions for placement of a base station (e.g., candidate $p_{tx}$ positions) in an environment, a set of possible antenna configurations (e.g., antenna configurations such as height, tilt, rotation, etc.) that are compatible with an environment's geography and a type of the antenna, etc.

The process 1100 further includes determining KPIs corresponding to candidate deployment parameters using an RF-RF model (1104). In some implementations, operation 1104 can be performed as described for operation 1004 of process 1000, except that the KPIs correspond to different deployment parameters rather than different communication parameters. For example, operation 1104 can include the process 900, except that candidate deployment parameters are used instead of candidate communication parameters 906 and/or 912. In some implementations, KPI are determined based on multiple $p_{rx}$ distributed across an environment, to test whether the evaluated deployment parameters can provide effective transmission throughout the environment. Deployment parameters are then selected based on the KPIs (1106), e.g., so as to maximize a target KPI or combination of target KPIs.

For example, a set of evaluated candidate communication parameters can include multiple $p_{tx}$ in an environment, e.g., at randomly and/or non-random locations, corresponding to possible locations for a base station. For each $p_{tx}$, the $p_{tx}$ and a set of multiple $p_{rx}$ are provided as inputs for RF-RF model processing (902), along with, in some implementations, other information and/or other candidate communication parameters. For each $p_{tx}$, as an output of the RF-RF model processing, channel characteristics 910 are determined for transmission between the $p_{tx}$ and each of the multiple tested $p_{rx}$. For example, a PDP can be determined for each $p_{tx}$-$p_{rx}$ pair to describe RF transmission from the $p_{tx}$ to the $p_{rx}$. The channel characteristics 910 can themselves include KPIs (914), and/or the channel characteristics 910 can be used to determine one or more KPIs 914 (904), in some implementations based on one or more other candidate communication parameters.

The channel characteristics 910 can be results of simulating RF transmission using ray-tracing in conjunction with RF-RF model outputs, e.g., simulating channel responses from one or more $p_{rx}$ in order to estimate (as channel characteristics and/or KPI) the received signal strength, the estimated signal to noise ratio, the estimated interference power, estimates of Doppler and delay spread, BER, BLER, throughput, etc., that may be observed given a particular base station placement $p_{tx}$. The channel characteristics 910 can include uplink and/or downlink characteristics. In some implementations, the KPI can include averages of KPI and/or channel characteristics across multiple $p_{rx}$, e.g., an average signal strength, SNR, or other parameter in a given region based on multiple $p_{rx}$ in the region.

In some implementations, a network is deployed and/or a deployment of an already-deployed network is reconfigured in accordance with the selected parameters (1108). For example, base stations can be placed at (or moved to) the $p_{tx}$ that are determined to provide the best KPIs, and antennas of the base stations can be deployed with (or reconfigured to have) configurations that are determined to provide the best KPIs.

Accordingly, various candidate positions may be evaluated as well as various antenna configurations, gains, beam patterns, antenna patterns, tilts, heights, rotations, etc., using RF-RF-based simulations to simulation propagation and resulting KPIs. Using these KPIs, cell planning locations and deployment parameters for one or more sectors may be chosen and tested pre-deployment in a world-accurate model for propagation in the vicinity of base stations. For example, prior to network deployment, process 1100 can be performed, and the network can be deployed according to the selected deployment parameters. KPIs can be determined for multiple types of deployment parameter jointly, so as to simultaneously optimize the multiple types of deployment parameter (e.g., jointly optimize base station placement and antenna configuration), to provide overall improved network function.

In some implementations, process 1100 can be used to predict coverage and interference in shared-spectrum scenarios and to perform shared spectrum planning. In shared-spectrum scenarios, multiple entities and/or types of entity can share a common frequency band. Currently, elements of spectrum sharing such as the Spectrum Access System (SAS) perform propagation modeling for shared spectrum planning. However, such modeling is often performed with overly-simplistic models such as height above average terrain (HAAT) models, to ensure that adjacent band licenses should not interfere. However, in many environments (e.g., in urban areas), these models are overly-pessimistic about interference and result in wasted opportunities for spectrum re-use. Accordingly, in some implementations, the network deployment parameters of FIG. 11 and process 1100 include one or more shared-spectrum parameters such as band allocations, power limits, user constraints, beam parameters, etc., that dictate how the RF spectrum should be shared between multiple networks. The selected shared-spectrum parameters can be assigned to spectrum users/networks, e.g., in the SAS. The KPIs for such a determination can include, for example, interference metrics, and RF-RF models can be used to simulate interference between RF signals from the multiple networks to determine the KPIs. Accordingly, the networks can be deployed in a manner that reduces or mitigates interference.

Other RF-RF Model Utilization Examples

Figure 12:
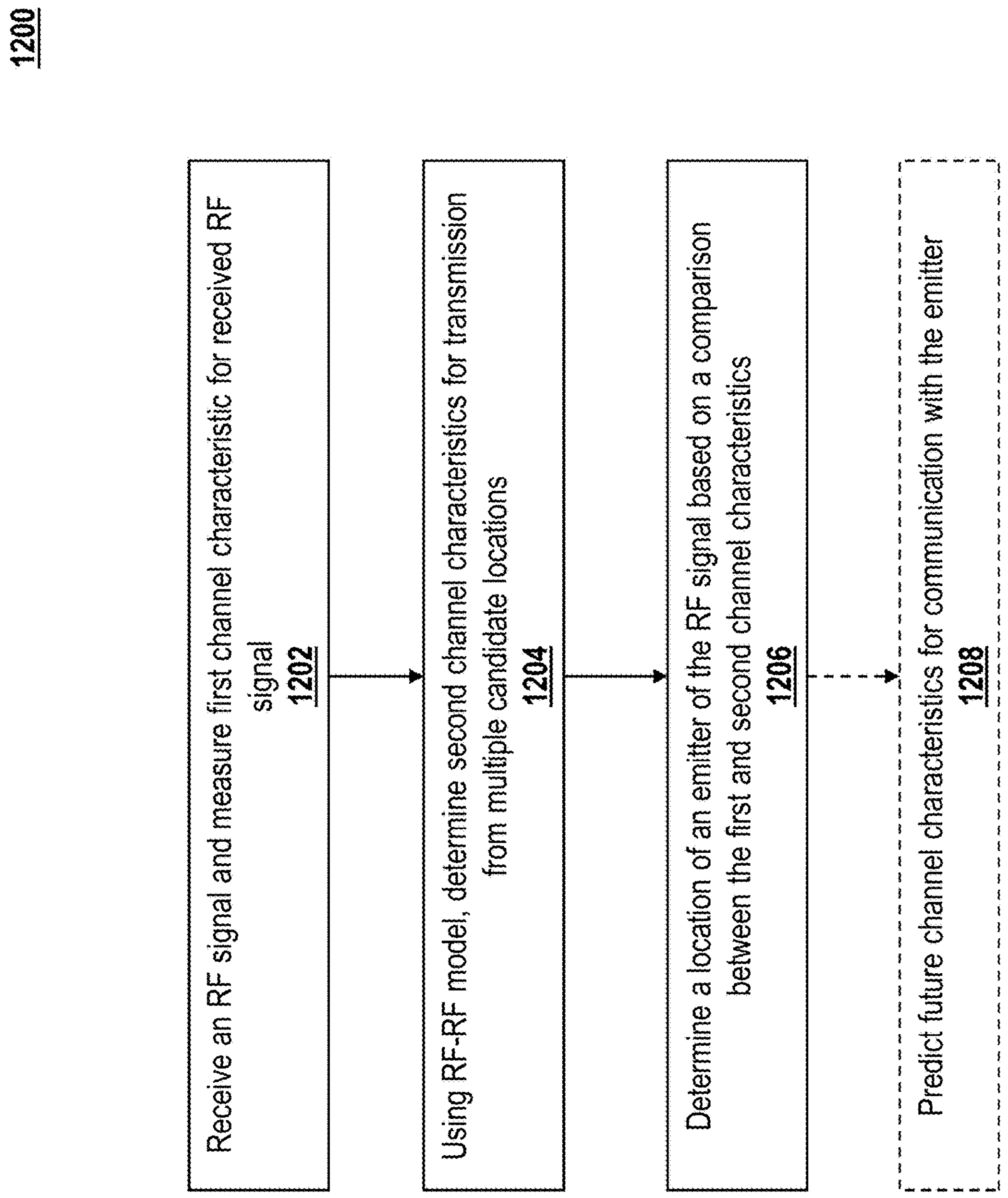
FIG. 12 is a diagram illustrating an example of a localization process for an emitter.

As another example of RF-RF model utilization, in some implementations, RF-RF models can be used for localization of emitters. For example, FIG. 12 illustrates an example of a process 1200 for determining a location of an emitter of a received signal. The process 1200 can be performed by any computing device or system, e.g., UE, DU, RU, CU, a RIC application, a cloud computing service, etc., or a combination thereof. For example, the process 1200 can be performed by any or more of the aforementioned systems and/or devices in communication systems 100, 600, and/or 700, and the RF-RF model and use of the RF-RF model in the process 1200 can correspond to any of the RF-RF models discussed in the previous sections, such as the process 200 and RF-RF model 500, without being limited to the specific architecture shown for RF-RF model 500. Existing techniques for emitter localization typically include approaches like time difference of arrival (TDOA), frequency difference of arrival (FDOA), power level or RSSI based localization, etc. However, RF-RF models can be used to perform localization based on channel characteristics, such as channel impulse response and PDP. Accordingly, in some implementations, localization accuracy and/or robustness can be improved compared to alternative methods.

The process 1200 includes receiving an RF signal and measuring one or more first channel characteristics for the received RF signal (1202). For example, the RF signal can be received at an RU of a base station or at UE, and a computing device or system of the RU or the UE, or another computing device or system (e.g., a DU or RIC app) can process the RF signal to determine one or more first channel characteristics. The RF signal can be received at a receiver having a known location (e.g., a known $p_{rx}$ for RF-RF model calculations), e.g., UE having a known location based on GNSS processing or a base station having a known fixed location. The RF signal can have any of the signal characteristics described for uplink and/or downlink signals 606 and 622 in reference to FIG. 6. For example, in some implementations, the RF signal is an uplink transmission (e.g., PUSCH transmission) received at a base station. The first channel characteristics (channel estimates) for the RF signal can be determined/estimated as described for operation 614 of FIG. 6.

As further shown in FIG. 12, an RF-RF model is used to determine one or more second channel characteristics for transmission from multiple candidate locations (1204), e.g., for hypothetical signals sent from the candidate locations (candidate $p_{tx}$) and received at the receiver of the RF signal ($p_{rx}$). The one or more second channel characteristics determined in operation 1204 can include the same type(s) of channel characteristics as the one or more first channel characteristics determined in operation 1202, e.g., channel impulse response and/or PDP. Operation 1204 can be performed as described for channel characteristic determination throughout this disclosure, e.g., by performing ray-tracing simulations using an RF-RF model as described in reference to FIGS. 2-3.

The process 1200 further includes determining a location of an emitter of the RF signal based on a comparison between the first channel characteristics and the second channel characteristics. For example, the multiple candidate $p_{tx}$ can be scored, where higher scores for a candidate $p_{tx}$ correspond to more-similar second channel characteristic(s) to the first channel characteristic(s). The highest-scoring $p_{tx}$ can be determined as the location of the emitter. As another example, each candidate $p_{tx}$ can be assigned a likelihood of being the location of the emitter based on the comparison. The comparison can use any one or more suitable distance metrics. For example, the RF-RF model can be used to produce estimated PDPs for a range of candidate $p_{tx}$ transmitter locations, and a distance metric may be used to compare to the actual (measured) PDPs. In some implementations, the process 1200 is at least partially iterative, e.g., the candidate locations $p_{tx}$ can be selected iteratively based on comparisons between each successive evaluated $p_{tx}$'s second channel characteristics and the first channel characteristics, e.g., in a gradient descent optimization process, a directed search, a pruned search, or volumetric random sampling, in some implementations with a guided sampler. In some implementations, emitter localization can be performed using signals received from an emitter at multiple receivers.

In some implementations, the RF-RF model has a configuration that allows the emitter location to be directly computed without extensive searching/candidate $p_{tx}$ evaluation. For example, in some implementations, if the RF-RF model includes machine learning model(s) that are invertible and/or differentiable (e.g., invertible and/or differentiable MLPs), an equation or system of equations relating the emitter location to the measured first channel characteristics can be solved to obtain the emitter location.

Besides providing accurate localization of emitters, in some implementations, the process 1200 allow for localization of emitters in very harsh 3D environments with many reflectors and multipath features, e.g., where direction of arrival, TDOA, and FDOA methods may fail or require precise frequency and/or timing synchronization. Localization of many emitters in highly reflective/harsh environments (e.g., urban environments, indoor environments such as factories, etc.) can be performed quickly and computationally inexpensively using the RF-RF model outputs, which may not be possible using other methods.

In some implementations, the process 1200 further includes predicting future channel characteristics for communication with the emitter (1208), e.g., channel characteristics for communication with a predicted next location of the emitter. For example, a base station or other network component (having a known $p_{rx}$) can perform operation 1206 to determine a current location $p_{tx,1}$ of an emitter (e.g., a mobile device). The base station or other network component can then, based on the $p_{tx,1}$ (and, in some implementations, other information, such as prior locations, Doppler effects in signals received from the emitter, etc.), predict a future location $p_{tx,2}$ of the emitter. In addition, the base station or other network component can use a trained RF-RF model to estimate channel characteristics (e.g., PDP) for transmission between $p_{rx}$ and $p_{tx,2}$, and configure signal transmission and/or reception based on the predicted channel characteristics, e.g., as described with respect to FIGS. 8-10.

In some implementations, localization using an RF-RF model can be performed as a fine-tuning process subsequent to use of another localization method that provides a rough location estimate. For example, signal strength-based triangulation can be used to determine an approximate location of a mobile device, and the process 1200 can be used to determine the location more precisely, where the candidate locations are restricted to a range defined based on the approximate location. In some implementations, this two-part localization can provide reduced localization time, e.g., compared to localization using only RF-RF model-based propagation simulation.

Although FIG. 12 illustrates localization of emitters, a similar process to the process 1200 can be used to localize receivers. For example, a UE can perform a localization process to determine its location in the event that GNSS-based localization is not available, or if the UE is in a harsh environment, with significant fading, in which GNSS-based localization may not be accurate. The localization process can use known $p_{tx}$ of one or more emitters, in conjunction with measured/estimated channel characteristics (e.g., PDP) based on one or more received signals, to evaluate multiple candidate receiver positions $p_{rx}$ and determine one of the candidate $p_{rx}$ as the position of the receiver. The process can be performed as described for the process 1200, with the difference being that process 1200 features known $p_{rx}$ and unknown $p_{tx}$, whereas the receiver localization process features unknown $p_{rx}$ and known $p_{tx}$.

Another example of utilization of an RF-RF model is simulation and measurement of performance of a device within an environment for which the RF-RF model has been trained. For example, given a trained RF-RF model and parameters for an area within a city, a specific drive path, or a route through the environment may be considered. For example, the route can be along a walking path, a road, a train, a UAV flight path, etc. It may be desirable to ensure that devices will maintain a sufficiently strong SINR along the path, and/or to understand which bands or resources, or antenna or beam configurations, or power levels, or modulation and coding (MCS) levels, should be chosen to maximize performance along the path. In some implementations, the path can be extracted from the planned route of an autonomous vehicle, such as a drone or self-driving car. In some implementations, the path can represent common behavior, for example, a common walking route or a route through an entrance to a building or stadium. In some implementations, an area under consideration can be a densely-used area, e.g., a city center or stadium. Positions along the path or in the area can be used as $p_{tx}$ and/or $p_{rx}$ in ray-tracing simulations using an RF-RF model to determine resulting channel characteristics and/or KPIs, e.g., as described in reference to processes 200, 800, 900, and 1000. In some implementations, the KPIs allow for the optimization of wireless system configurations and/or processing choices for a wireless system in communication with devices on the path or in the area, e.g., as described in reference to processes 1000 and 1100. RF-RF models trained for paths and areas in urban, rural, or other classes of environments may be used to test various urban or rural modes or used for training or validation of neural RAN components or other RAN components.

In some implementations, one or more special physical layer networks such as autoencoders, neural receivers, or other related neural signal processing routines are trained or conditioned on the knowledge embedded in the RF-RF model for the path or area. For example, an equalizer (e.g., in a base station or UE) can be configured to use an expected PDP (determined using an RF-RF model) as a prior to improve performance and link margin, e.g., with reduced sounding or reference information.

Figure 13:
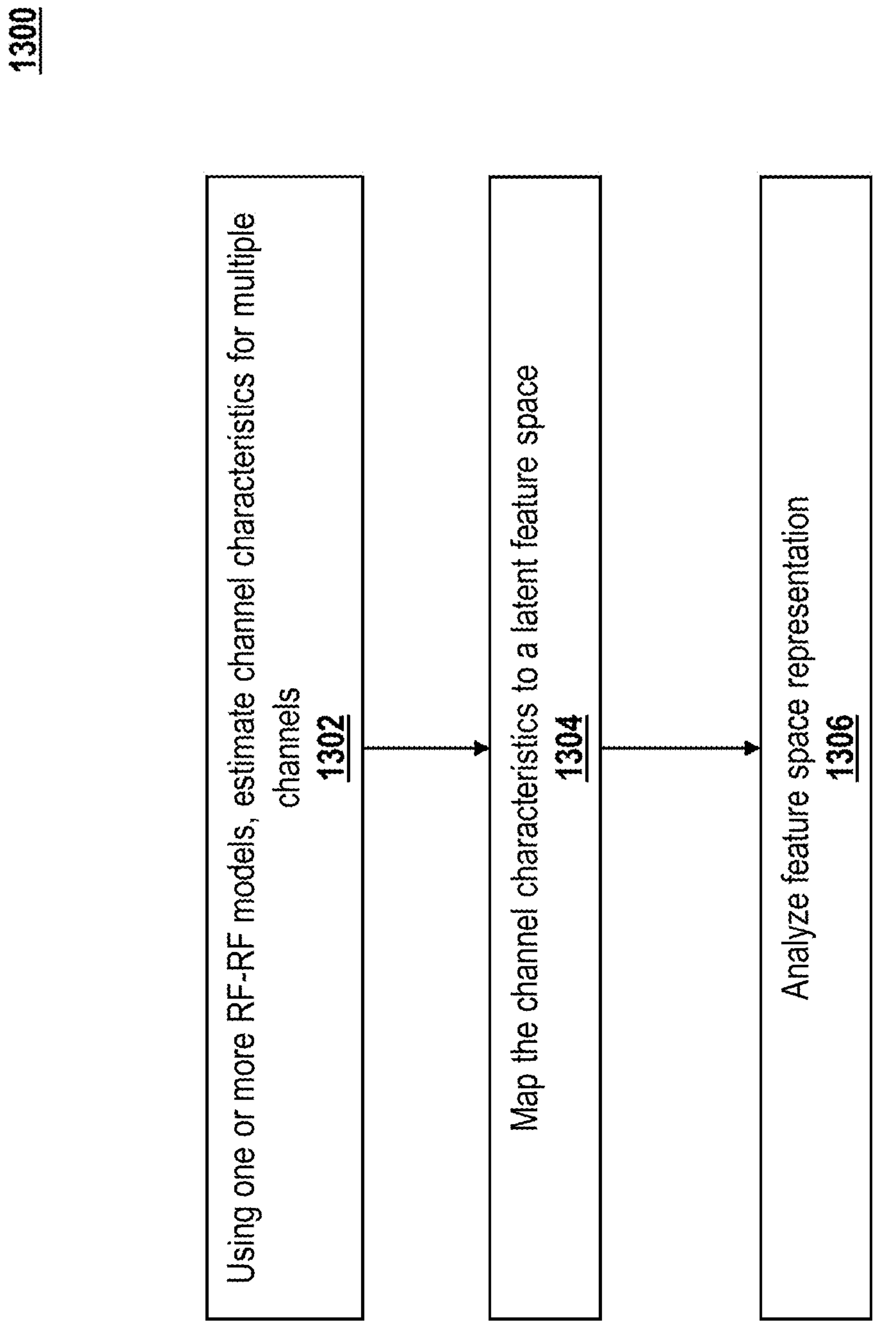
FIG. 13 is a diagram illustrating an example of a process for estimating channel characteristics using one or more RF-RF models.

In some implementations, channel characteristics (e.g., PDP) determined using RF-RF models can be represented in a latent feature space to promote analysis of the channel characteristics. For example, as shown in FIG. 13, a process 1300 includes using one or more RF-RF models to estimate channel characteristics for multiple channels (1302). For example, the channel characteristics can be PDP. The multiple channels can be, for example, channels for transmission between multiple different $p_{tx}$ and/or $p_{rx}$ pairs, channels corresponding to different portions of an environment, and/or channels corresponding to different RF frequencies, or multiple channels having any other difference described herein. Channel estimation can be performed as discussed throughout this disclosure, e.g., in reference to FIGS. 2-3. The process 1300 can be performed by any computing device or system, e.g., UE, DU, RU, CU, a RIC application, a cloud computing service, etc., or a combination thereof. For example, the process 1300 can be performed by any or more of the aforementioned systems and/or devices in communication systems 100, 600, and/or 700, and the RF-RF model and use of the RF-RF model in the process 1200 can correspond to any of the RF-RF models discussed in the previous sections, such as the process 200 and RF-RF model 500, without being limited to the specific architecture shown for RF-RF model 500.

The channel characteristics are mapped to a latent feature space (1304). For example, the mapping can be a dimensionality reduction, e.g., using techniques such as t-distributed stochastic neighbor embedding (t-SNE), uniform manifold approximation and projection (UMAP), and/or the like. Mapped features can include spatial features such as $p_{rx}$ and $p_{tx}$ and/or any other variable associated with determination of the channel characteristics.

The feature space representation of the channel characteristics is analyzed (1306), e.g., to guide network configuration, deployment, etc. For example, the channel characteristics can be plotted, partitioned, and/or clustered based on their feature space representations. The representation can expose similarities between and salient features of different channels. For example, line of sight (LOS) channels may cluster into a specific region of the feature space, which may be clearly distinct from non-LOS channels in the feature space. Certain areas within one or more sectors may have similar channel response properties to others. Feature-space clusterings can expose, for example, how well the RF-RF simulations match real world measurements, and how well a simplified TDL, CDL or other type of model fit matches to the RF-RF-derived channel responses (for example, these model fits may be visually separated and observed within the clustering space). This can help to illustrate where simplified models fail to match the real world, and to help identify where channels are similar or different. For example, partitions or clusters of these regions may be used to train different communications systems models such as neural receivers, neural beamformers, autoencoder schemes, etc. They may also be used to identify locations with extreme issues (such as very bad delay spread or very harsh multipath) which are uniquely different from the rest of the regions. These may help in coverage analysis, or may be used to help make adjustments to change network deployment choices such as antenna pointing, tilt, height, power levels, locations, etc. For example, based on the feature space representation, network deployment can be configured as described for operation 1108.

Figure 15:
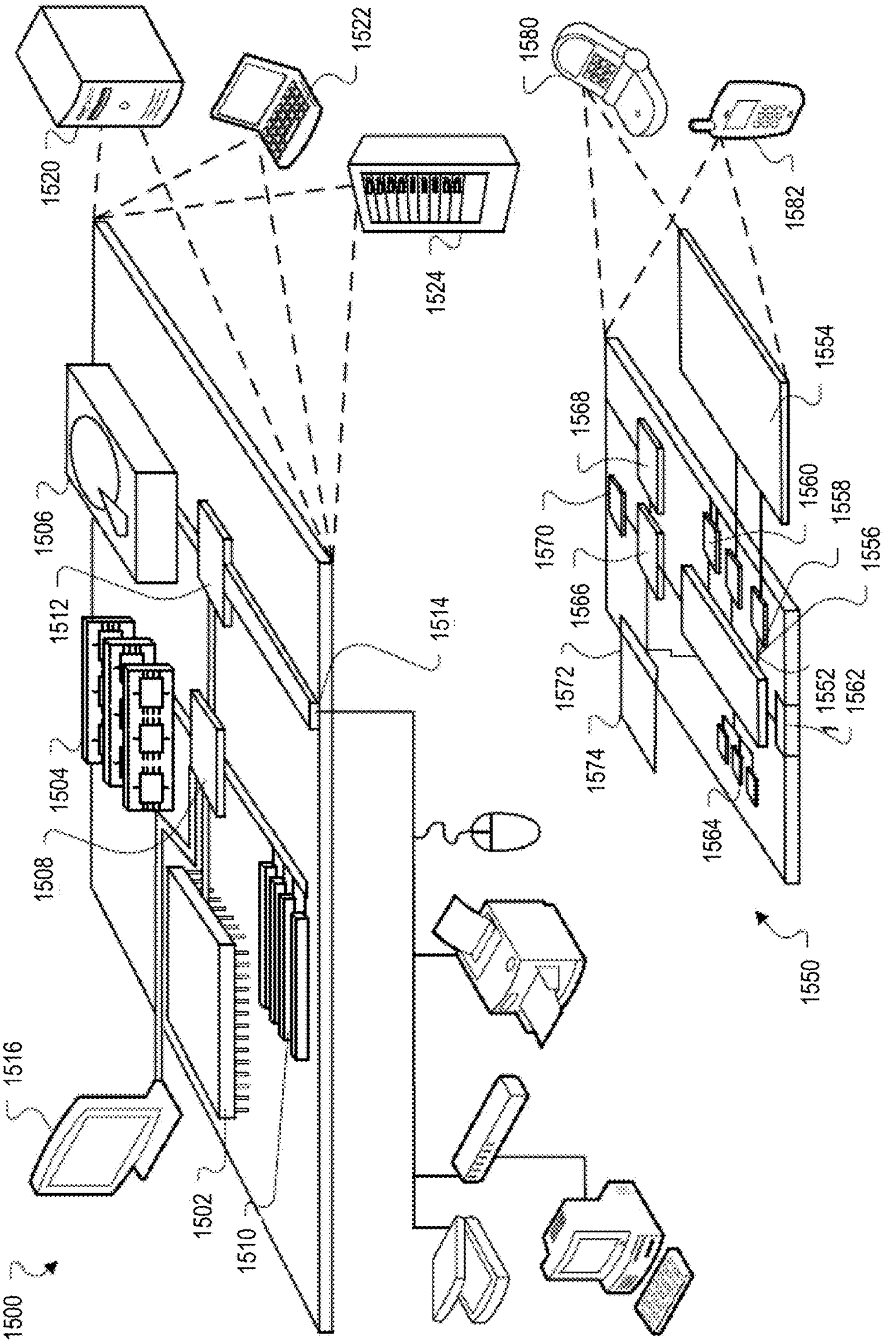
FIG. 15 is a diagram illustrating an example of a computer system.

FIG. 15 is a diagram illustrating an example of a computing system that may be used to implement one or more components of a system that utilizes RF-RF models for RF system operations. The computer system illustrated in FIG. 15 can be, or can include, one or more of the network devices and modules described herein, e.g., UE, DU, RU, CU, and cloud computing system, for example in any of systems 100, 600, and/or 700. The computer system illustrated in FIG. 15, and/or a component or portion thereof, can be used to perform any of the processes described herein, such as processes 200, 610, 800, 900, 1000, 1100, 1200, and/or 1300.

The computing system includes computing device 1500 and a mobile computing device 1550 that can be used to implement the techniques described herein. For example, either or both of the computing device 1500 and the mobile computing device 1550 can execute an RF-RF model for RF communication control and/or other purposes.

The computing device 1500 is intended to represent various forms of digital computers and network components, such as laptops, desktops, workstations, personal digital assistants, servers, blade servers, cloud computing systems, base stations, mainframes, back-end network equipment, and other appropriate computers. The mobile computing device 1550 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 1500 includes a processor 1502, a memory 1504, a storage device 1506, a high-speed interface 1508 connecting to the memory 1504 and multiple high-speed expansion ports 1510, and a low-speed interface 1512 connecting to a low-speed expansion port 1514 and the storage device 1506. Each of the processor 1502, the memory 1504, the storage device 1506, the high-speed interface 1508, the high-speed expansion ports 1510, and the low-speed interface 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as a display 1516 coupled to the high-speed interface 1508. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1502 is a single-threaded processor. In some implementations, the processor 1502 is a multi-threaded processor. In some implementations, the processor 1502 is a quantum computer.

The memory 1504 stores information within the computing device 1500. In some implementations, the memory 1504 is a volatile memory unit or units. In some implementations, the memory 1504 is a non-volatile memory unit or units. The memory 1504 may also be another form of computer-readable medium, such as a magnetic or optical disk.

The storage device 1506 is capable of providing mass storage for the computing device 1500. In some implementations, the storage device 1506 is or includes a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1502), perform one or more methods, such as those described above. The instructions can also be stored by one or more storage devices such as computer- or machine-readable mediums (for example, the memory 1504, the storage device 1506, or memory on the processor 1502). The high-speed interface 1508 manages bandwidth-intensive operations for the computing device 1500, while the low-speed interface 1512 manages lower bandwidth-intensive operations. Such allocation of functions is an example only. In some implementations, the high-speed interface 1508 is coupled to the memory 1504, the display 1516 (e.g., through a graphics processor or accelerator), and to the high-speed expansion ports 1510, which may accept various expansion cards (not shown). In the implementation, the low-speed interface 1512 is coupled to the storage device 1506 and the low-speed expansion port 1514. The low-speed expansion port 1514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. In addition, it may be implemented in a personal computer such as a laptop computer 1522. It may also be implemented as part of a rack server system 1524. Alternatively, components from the computing device 1500 may be combined with other components in a mobile device (not shown), such as a mobile computing device 1550. Each of such devices may include one or more of the computing device 1500 and the mobile computing device 1550, and an entire system may be made up of multiple computing devices communicating with each other.

The mobile computing device 1550 includes a processor 1552, a memory 1564, an input/output device such as a display 1554, a communication interface 1566, and a transceiver 1568, among other components. The mobile computing device 1550 may also be provided with a storage device, such as a micro-drive or other device, to provide additional storage. Each of the processor 1552, the memory 1564, the display 1554, the communication interface 1566, and the transceiver 1568, are interconnected using various buses, and several of the components may be mounted on a common motherboard or in other manners as appropriate.

The processor 1552 can execute instructions within the mobile computing device 1550, including instructions stored in the memory 1564. The processor 1552 may be implemented as a chipset of chips that include separate and multiple analog and digital processors. The processor 1552 may provide, for example, for coordination of the other components of the mobile computing device 1550, such as control of user interfaces, applications run by the mobile computing device 1550, and wireless communication by the mobile computing device 1550.

The processor 1552 may communicate with a user through a control interface 1558 and a display interface 1556 coupled to the display 1554. The display 1554 may be, for example, a TFT (Thin-Film-Transistor Liquid Crystal Display) display or an OLED (Organic Light Emitting Diode) display, or other appropriate display technology. The display interface 1556 may include appropriate circuitry for driving the display 1554 to present graphical and other information to a user. The control interface 1558 may receive commands from a user and convert them for submission to the processor 1552. In addition, an external interface 1562 may provide communication with the processor 1552, so as to enable near area communication of the mobile computing device 1550 with other devices. The external interface 1562 may provide, for example, for wired communication in some implementations, or for wireless communication in other implementations, and multiple interfaces may also be used.

The memory 1564 stores information within the mobile computing device 1550. The memory 1564 can be implemented as one or more of a computer-readable medium or media, a volatile memory unit or units, or a non-volatile memory unit or units. An expansion memory 1574 may also be provided and connected to the mobile computing device 1550 through an expansion interface 1572, which may include, for example, a SIMM (Single In Line Memory Module) card interface. The expansion memory 1574 may provide extra storage space for the mobile computing device 1550, or may also store applications or other information for the mobile computing device 1550. Specifically, the expansion memory 1574 may include instructions to carry out or supplement the processes described above, and may include secure information also. Thus, for example, the expansion memory 1574 may be provide as a security module for the mobile computing device 1550, and may be programmed with instructions that permit secure use of the mobile computing device 1550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 1552), perform one or more methods, such as those described above. The instructions can also be stored by one or more storage devices, such as one or more computer- or machine-readable mediums (for example, the memory 1564, the expansion memory 1574, or memory on the processor 1552). In some implementations, the instructions are received in a propagated signal, for example, over the transceiver 1568 or the external interface 1562.

The mobile computing device 1550 may communicate wirelessly through the communication interface 1566 (e.g., with the computing device 1500), which may include digital signal processing circuitry where appropriate. The communication interface 1566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 1568 using a radio frequency. In addition, short-range communication may occur, such as using a Bluetooth, Wi-Fi, or other such transceiver (not shown). In addition, a GPS (Global Positioning System) receiver module 1570 may provide additional navigation- and location-related wireless data to the mobile computing device 1550, which may be used as appropriate by applications running on the mobile computing device 1550.

The mobile computing device 1550 may also communicate audibly using an audio codec 1560, which may receive spoken information from a user and convert it to usable digital information. The audio codec 1560 may likewise generate audible sound for a user, such as through a speaker, e.g., in a handset of the mobile computing device 1550. Such sound may include sound from voice telephone calls, may include recorded sound (e.g., voice messages, music files, etc.) and may also include sound generated by applications operating on the mobile computing device 1550.

The mobile computing device 1550 may be implemented in a number of different forms, as shown in the figure. For example, it may be implemented as a cellular telephone 1580. It may also be implemented as part of a smart-phone 1582, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A number of implementations have been described. Nevertheless, it will be understood that various modifications may be made. For example, although various examples have been described in reference to cellular networks (e.g., cellular RAN architectures), the described RF-RF systems and processes can be deployed in various other network contexts, such as Wi-Fi, Bluetooth, wireless LANs, Internet of Things (IoT), and/or other RF environments.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A method comprising:

executing a radio frequency radiance field (RF-RF) model characterizing an environment;

determining, based on outputs of the RF-RF model, one or more characteristics of a wireless channel between a first position and a second position in the environment; and controlling, based on the one or more characteristics of the wireless channel, a radio frequency (RF) communication between the first position and the second position.

2. The method of claim 1, wherein the one or more characteristics of the wireless channel comprise at least one characteristic that describes time-domain signal propagation over the wireless channel.

3. The method of claim 2, wherein the at least one characteristic that describes time-domain signal propagation comprises at least one of a power delay profile (PDP) for the wireless channel or an impulse response for the wireless channel.

4. The method of claim 1, wherein determining the one or more characteristics of the wireless channel comprises tracing a ray in the environment between the first position and the second position, and wherein the outputs of the RF-RF model comprise metric corresponding to characteristics of interaction between RF signals and the environment at positions along the ray.

5. The method of claim 4, wherein the characteristics of interaction between the RF signals and the environment at the positions along the ray comprise:

a reflectance, and at least one of an absorption or a transmittance.

6. The method of claim 5, wherein the ray comprises a first segment and a second segment, wherein the positions along the ray comprise a reflection point at which the first segment and the second segment meet, and wherein executing the RF-RF model comprises providing, as at least one input to the RF-RF model, an angle of the first segment and an angle of the second segment.

7. The method of claim 4, wherein determining the one or more characteristics of the wireless channel is based on a time for light to traverse the ray.

8. The method of claim 4, wherein the one or more characteristics of the wireless channel comprise a power delay profile (PDP) for RF transmission between the first position and the second position, and wherein determining the PDP is based on:

a power level associated with transmission from the first position to the second position along the ray, the power level determined based on the outputs of the RF-RF model, a time for light to traverse the ray, a plurality of other power levels associated with transmission from the first position to the second position along a plurality of other rays between the first position and the second position, the plurality of other power levels determined based on the outputs of the RF-RF model, and times for light to traverse the plurality of other rays.

9. The method of claim 4, comprising tracing the ray by:

determining a boundary of a region based on RF signal attenuation;

selecting a point within the region; and determining the ray as a ray between the first position and the second position and passing through the point.

10. The method of claim 1, wherein the RF-RF model comprises:

a first model trained to output absorptions or transmittances associated with a plurality of positions in the environment; and a second model trained to output reflectances associated with the plurality of positions in the environment.

11. The method of claim 1, wherein the RF-RF model comprises a first neural network and a second neural network, and wherein executing the RF-RF model comprises providing an output of the first neural network as an input to the second neural network.

12. The method of claim 1, wherein the RF-RF model comprises a learned position embedding module configured to receive, as input, a position in the environment, and to provide, as output, a higher-dimensional embedding of the position, and wherein the RF-RF model is configured to use the higher-dimensional embedding as input to another portion of the RF-RF model.

13. The method of claim 1, wherein executing the RF-RF model comprises providing, as input to the RF-RF model, at least one of a weather condition, a time condition, an identifier of an emitter or receiver, a signal frequency, a signal modulation, or a beam parameter.

14. The method of claim 1, wherein controlling the RF communication comprises:

determining at least one communication parameter based on the one or more characteristics of the wireless channel; and controlling an RF device to transmit an RF signal or receive the RF signal in accordance with the at least one communication parameter.

15. The method of claim 14, wherein the at least one communication parameter comprises a scheduling of the RF signal, a beamforming parameter to emit the RF signal, a modulation of the RF signal, a frequency of the RF signal, a power level of the RF signal, a spatial mode of the RF signal, or a resource allocation for the RF signal.

16. The method of claim 14, wherein determining the at least one communication parameter comprises:

using the RF-RF model to simulate, using each of a plurality of candidate communication parameters, RF signal propagation between positions corresponding to the RF signal;

determining, based on simulating the RF signal propagation, a value of at least one performance indicator for each of the plurality of candidate communication parameters; and selecting the at least one communication parameter based on the values of the at least one performance indicator.

17. The method of claim 1, comprising training the RF-RF model, wherein training the RF-RF model comprises:

receiving an RF signal, at a first known position in the environment, from an emitter at a second known position in the environment;

determining, based on the received RF signal, one or more characteristics of a second wireless channel between the first known position and the second known position; and training the RF-RF model based on a difference between (i) the determined one or more characteristics of the second wireless channel and (ii) one or more characteristics of the second wireless channel that are estimated by the RF-RF model based on the first known position and the second known position.

18. The method of claim 17, wherein training the RF-RF model comprises training a set of spherical harmonics that represent at least one of an antenna pattern of the emitter or an antenna pattern of a receiver of the RF signal.

19. The method of claim 1, comprising:

storing the RF-RF model on a mobile device, receiving an RF signal at the mobile device;

updating, at the mobile device, one or more parameters of the RF-RF model based on the received RF signal; and sending the updated one or more parameters from the mobile device to another device.

20. The method of claim 1, comprising:

receiving an RF signal, at a known position in the environment, from an emitter at an emitter position in the environment;

determining, based on the received RF signal, one or more characteristics of a second wireless channel between the known position and the emitter position;

using the RF-RF model to simulate RF signal propagation between the known position and multiple candidate emitter positions, to determine simulated channel characteristics; and determining the emitter position based on comparisons between the one or more characteristics of the second wireless channel and the simulated channel characteristics.

21. The method of claim 1, wherein the RF-RF model comprises a Gaussian splatting model that represents the environment as multiple volumetric regions having parametric properties, wherein the multiple volumetric regions are encoded with (i) characteristics of at least one ray output from the multiple volumetric regions, and (ii) a temporal parameter associated with propagation time delay.

22. A computer system, comprising:

one or more processors, and one or more non-transitory, computer-readable storage media storing instructions that, when executed by the one or more processors, cause the one or more processors to perform operations comprising:

executing a radio frequency radiance field (RF-RF) model characterizing an environment;

determining, based on outputs of the RF-RF model, one or more characteristics of a wireless channel between a first position and a second position in the environment; and controlling, based on the one or more characteristics of the wireless channel, an RF communication between the first position and the second position.

* * * * *